Aug. 12, 1952 K. R. STADTHAUS 2,606,359
CONTINUOUS AUTOMATIC MULTISPINDLE LATHE
Filed April 2, 1948 24 Sheets-Sheet 11

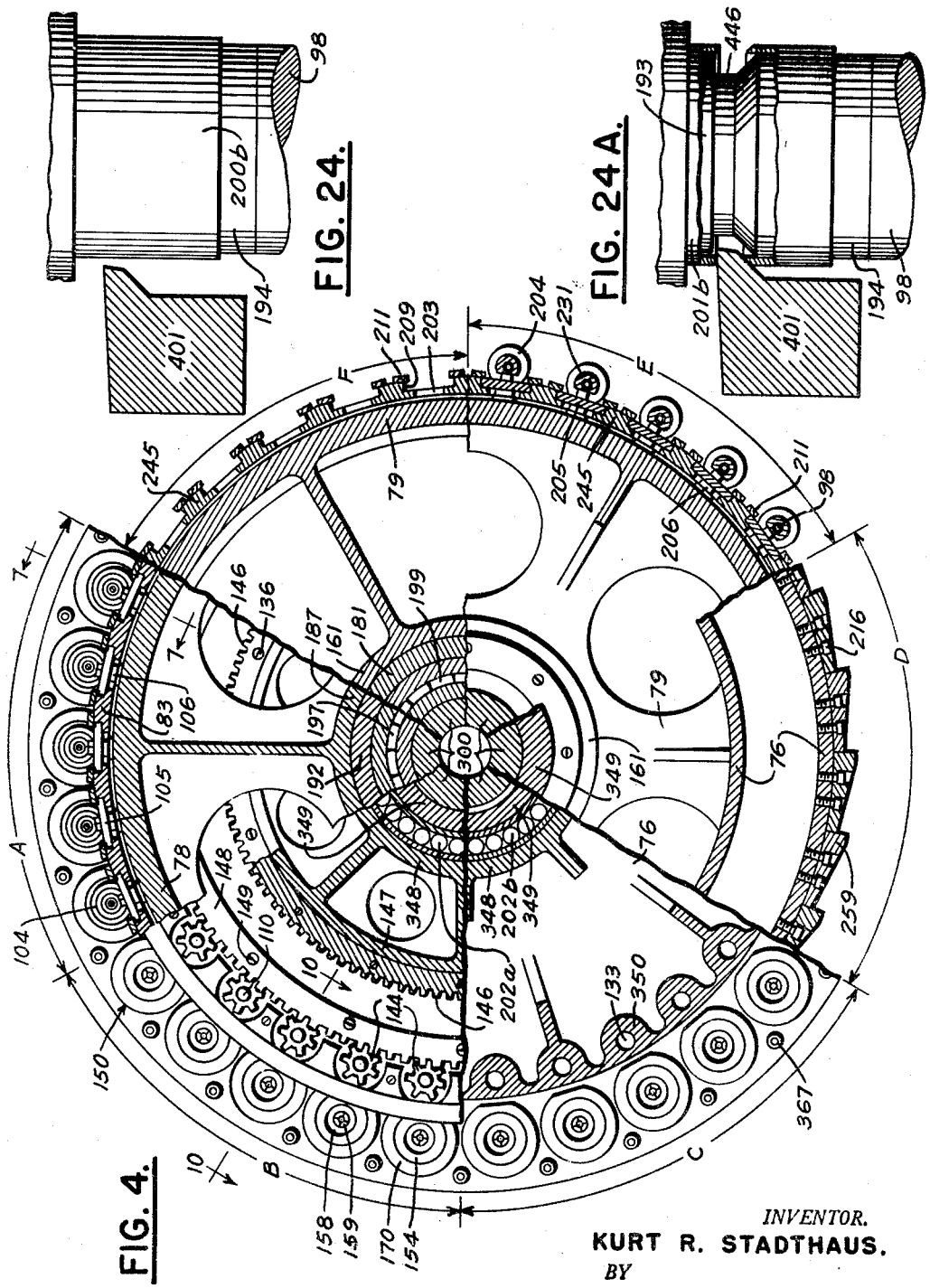

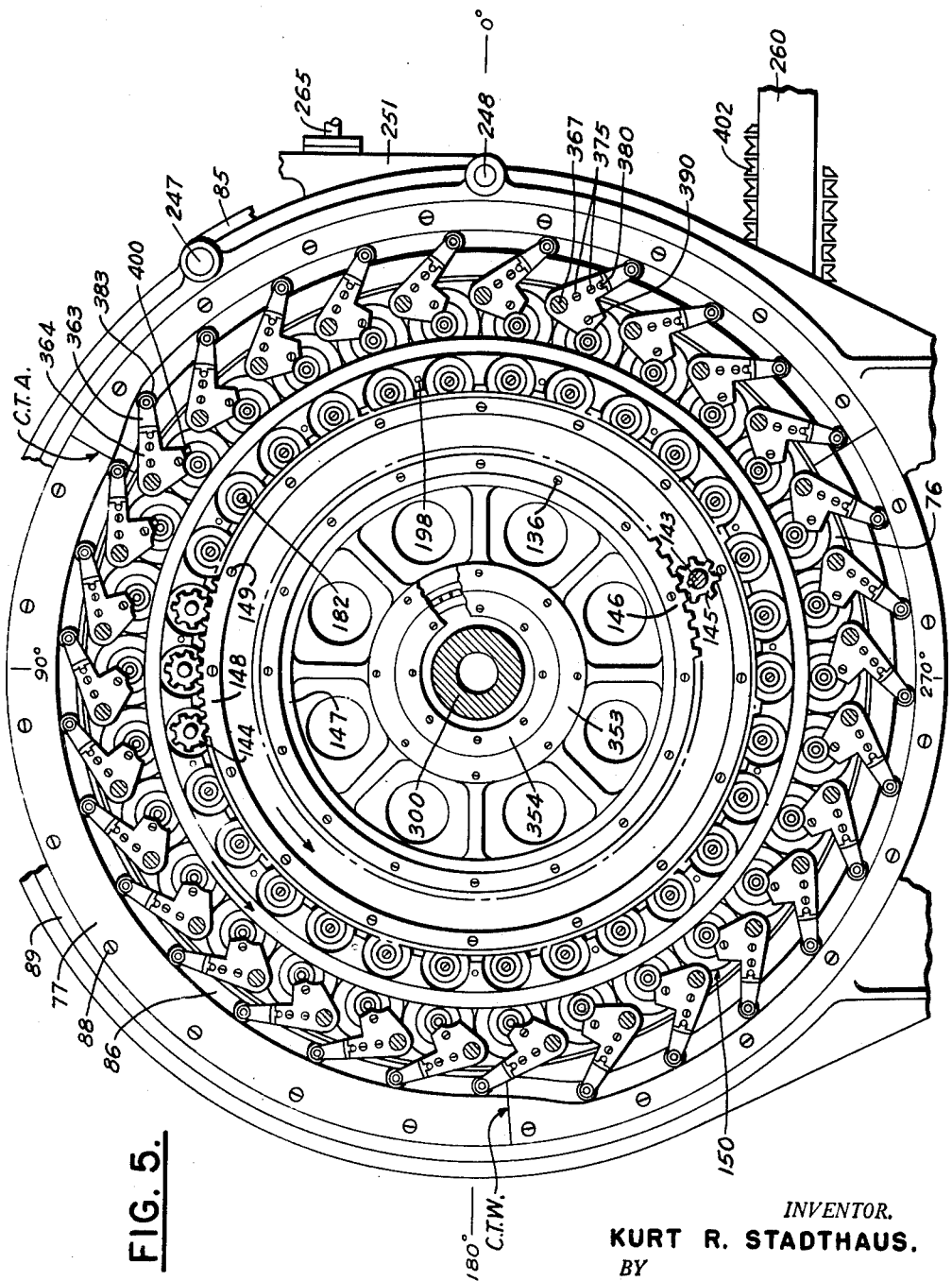

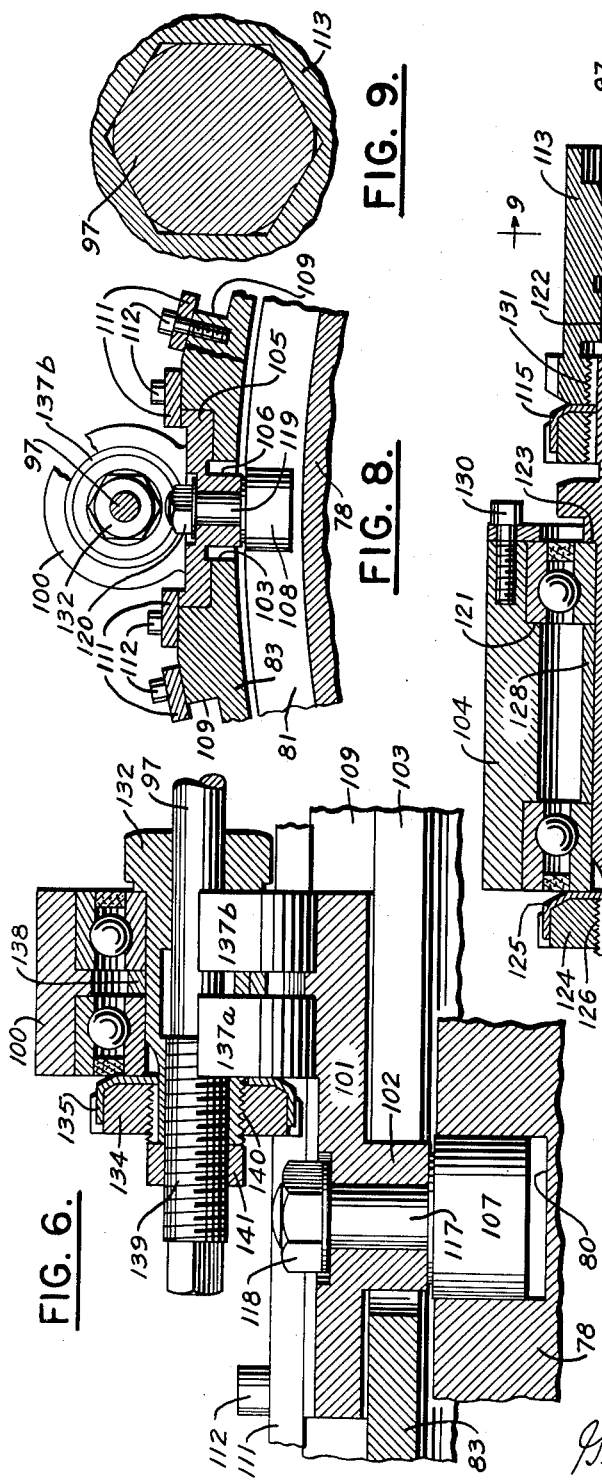

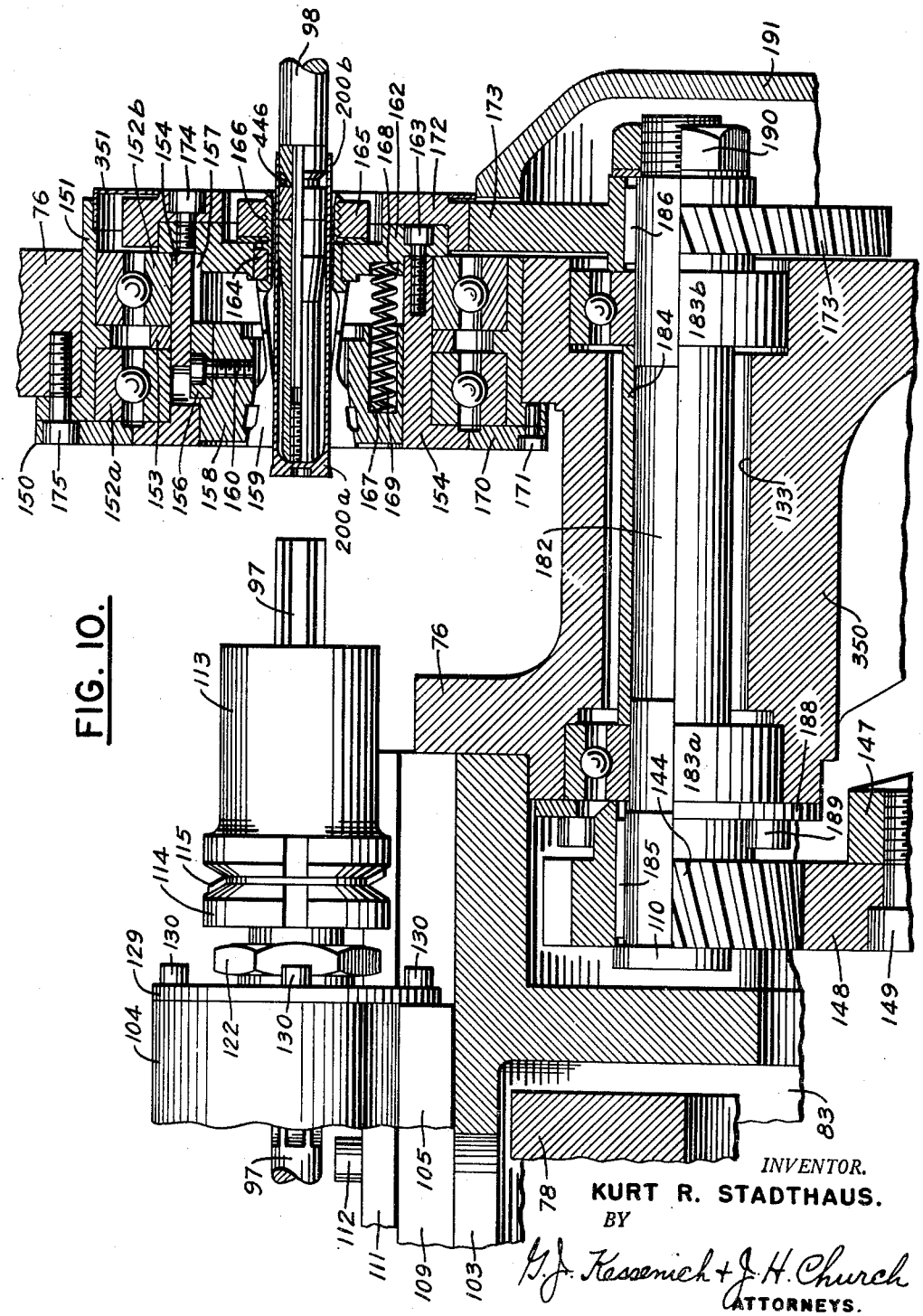

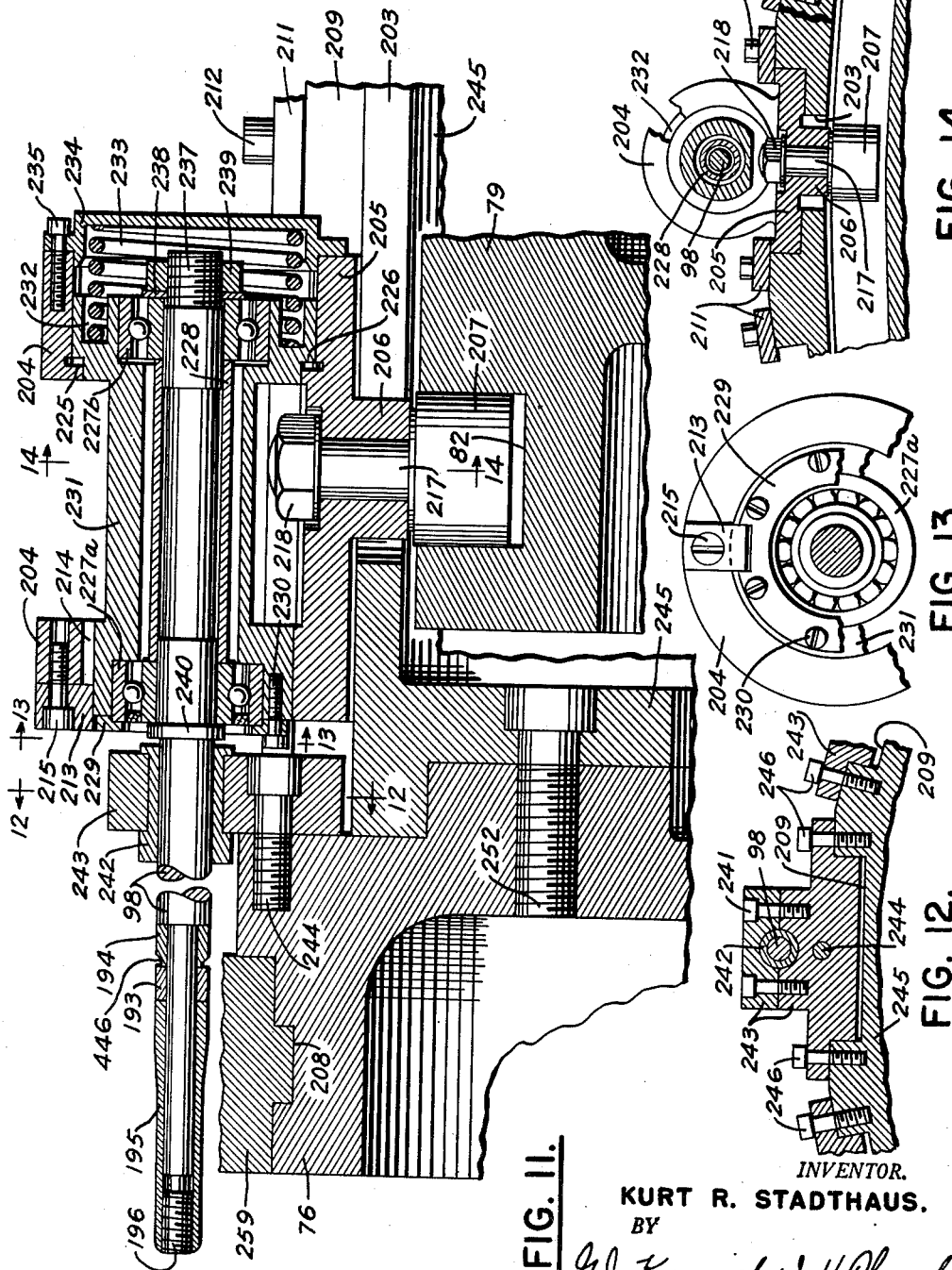

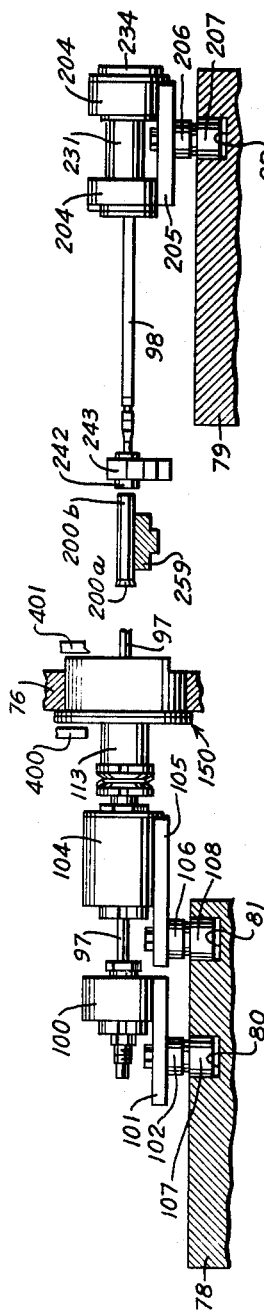
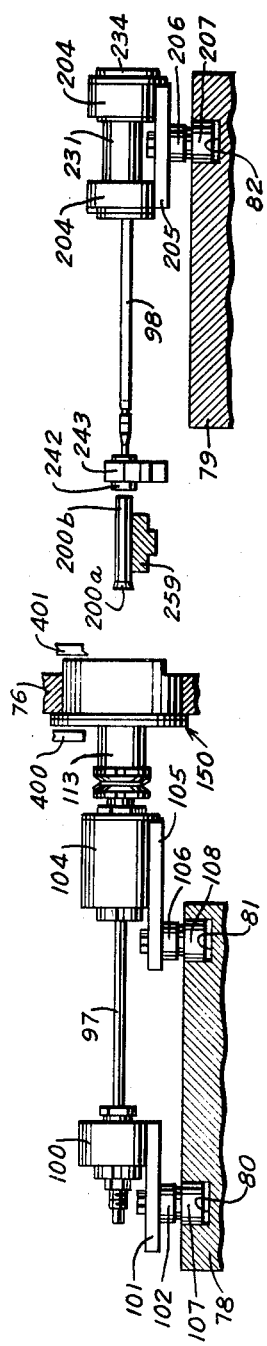
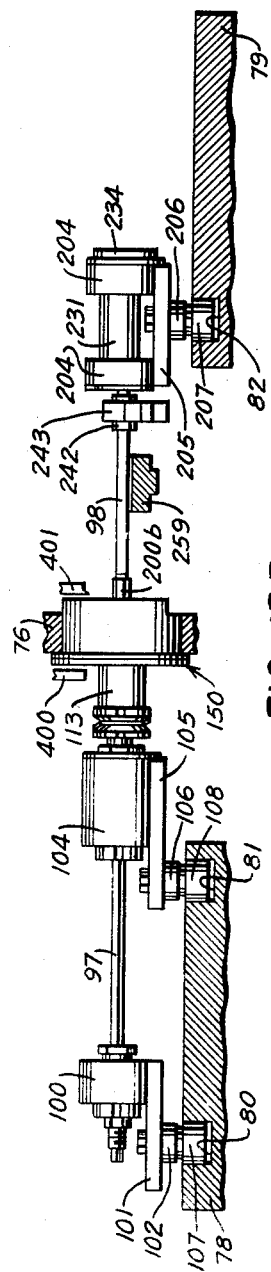

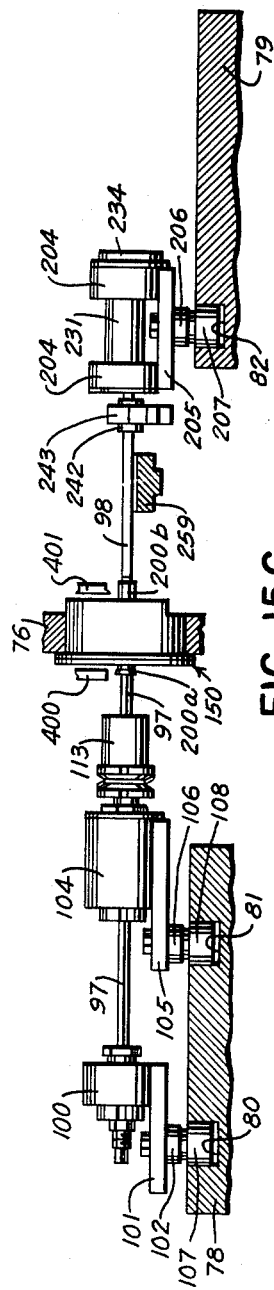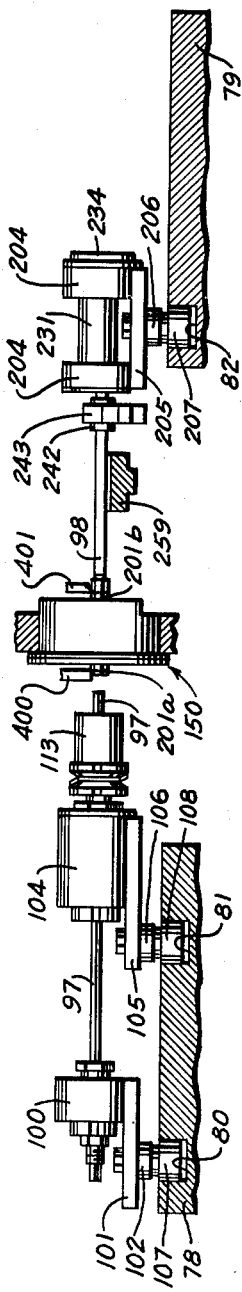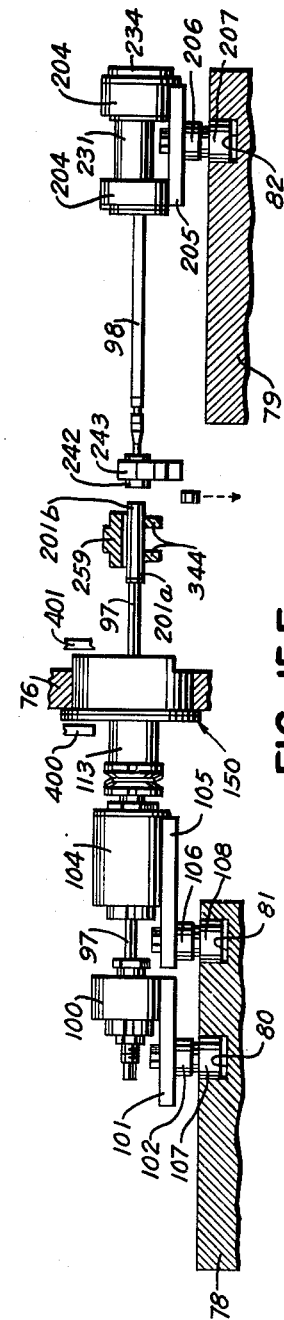

INVENTOR.
KURT R. STADTHAUS.
BY
G. J. Kessenich + J. H. Church
ATTORNEYS.

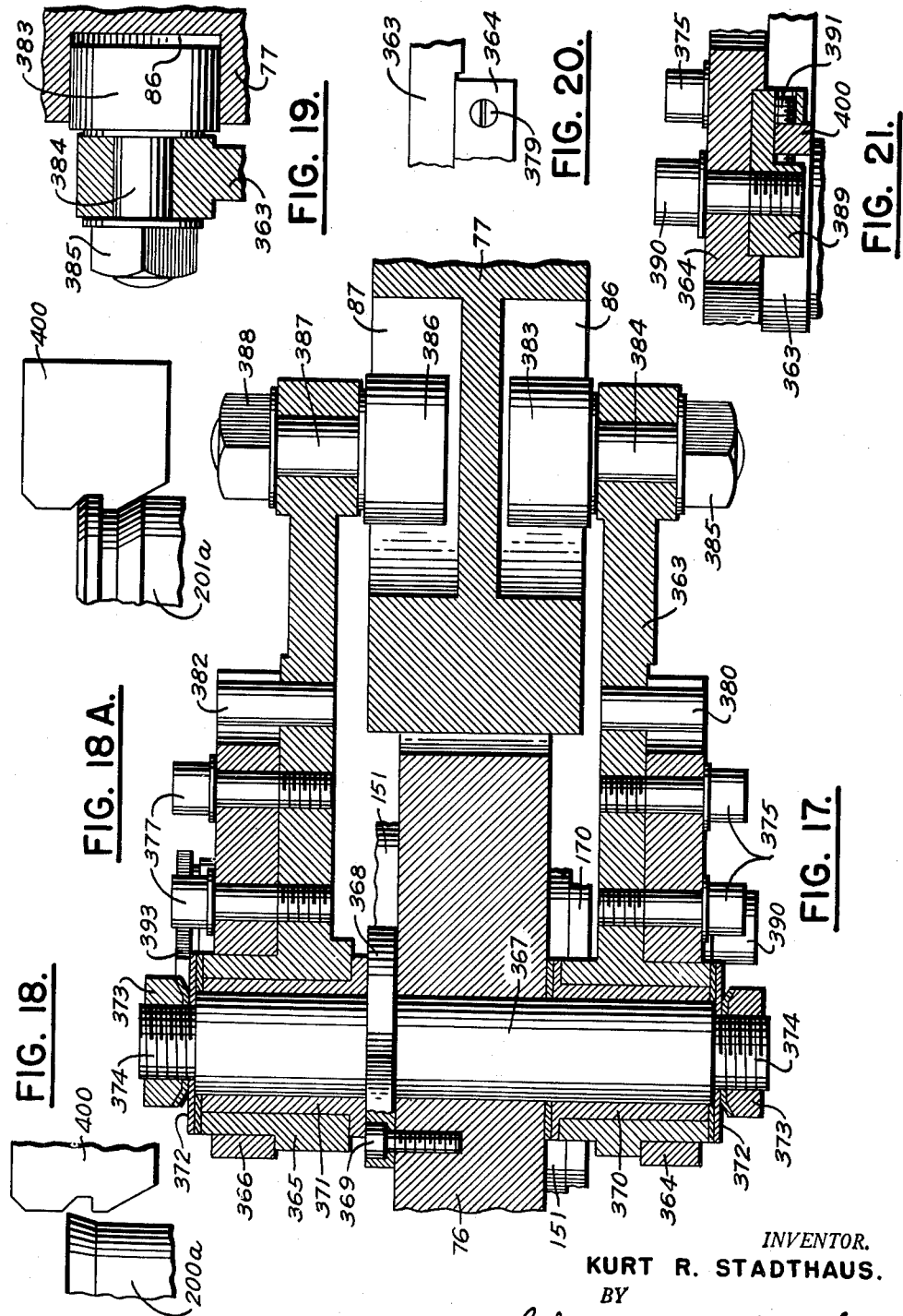

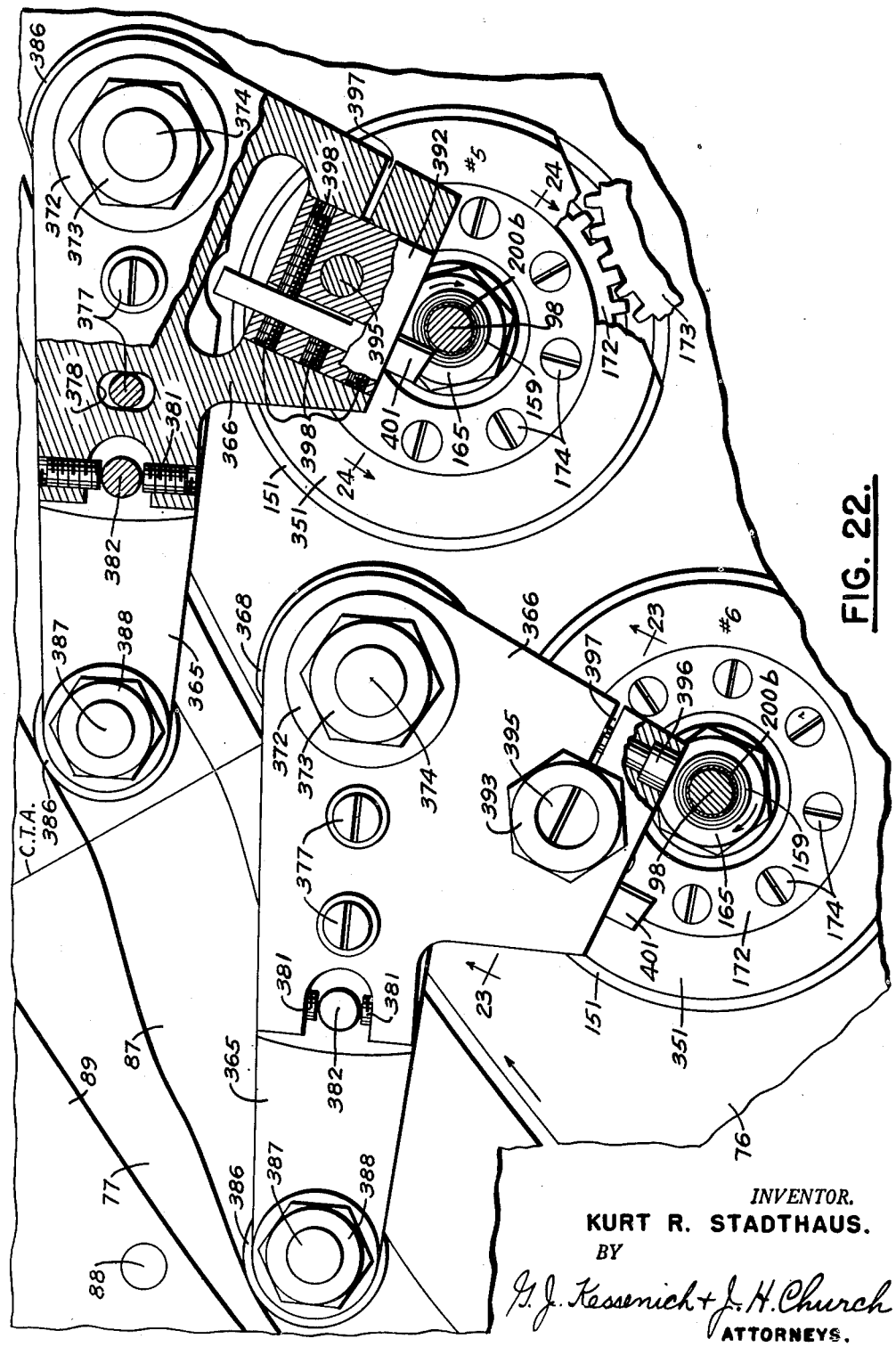

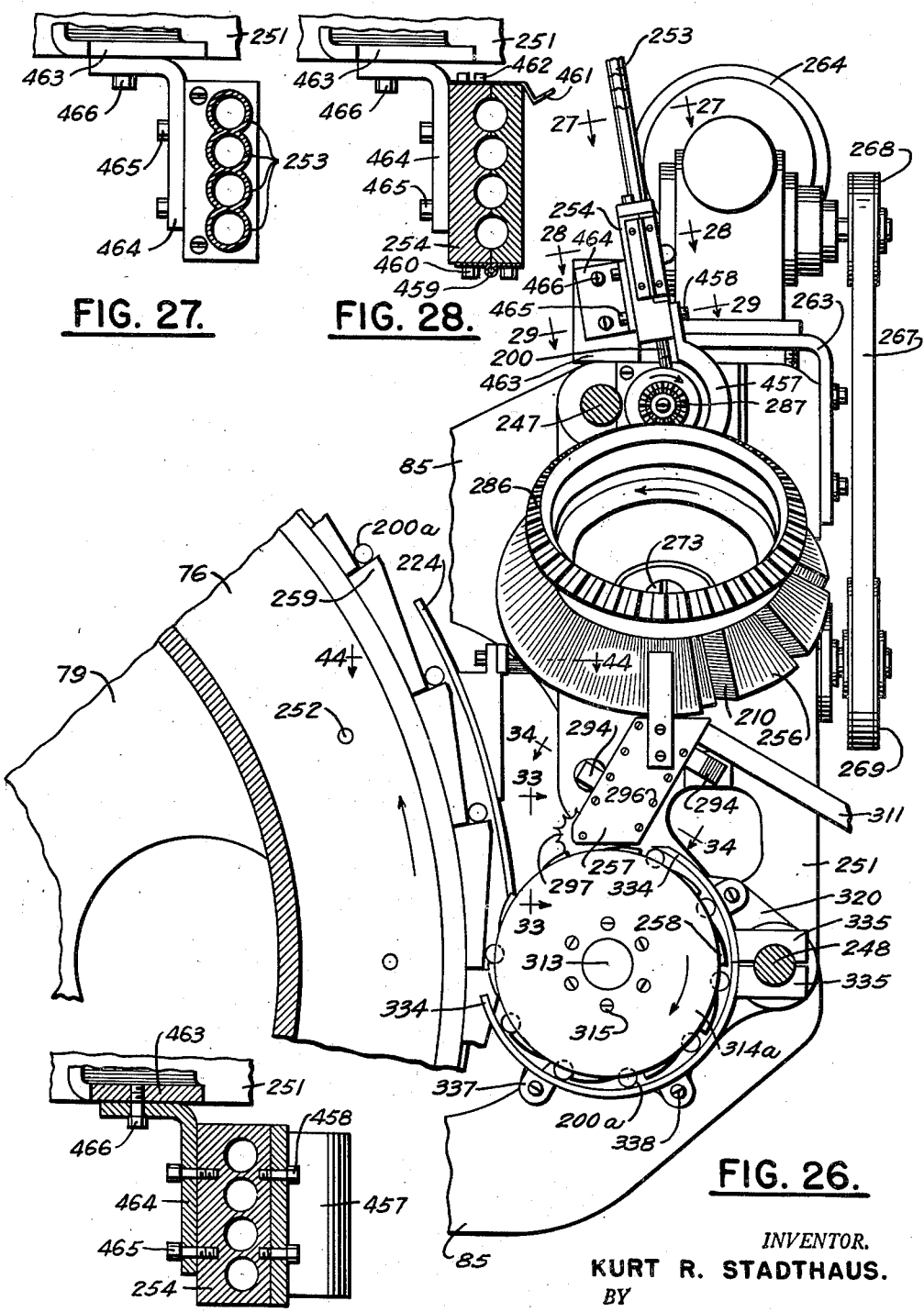

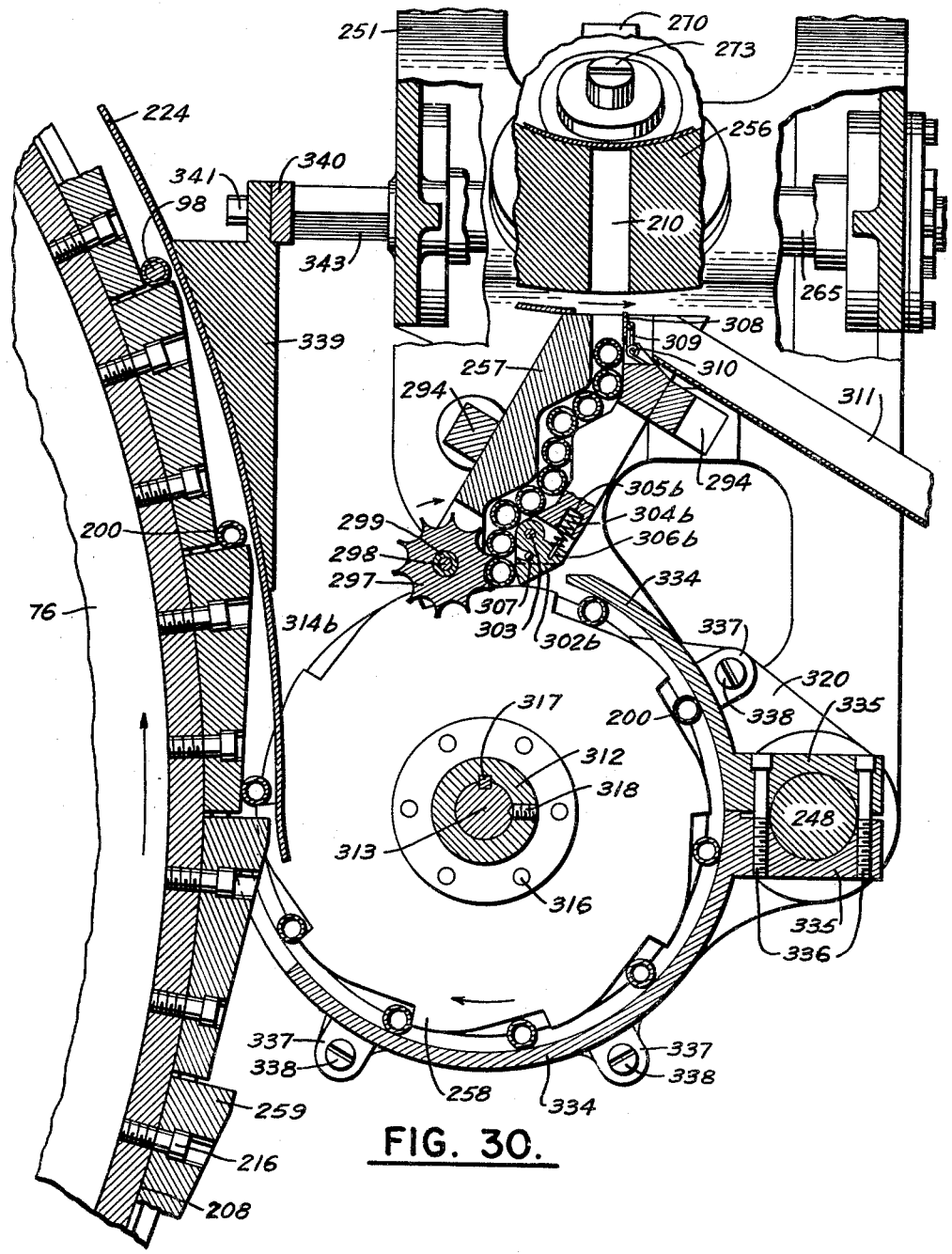

*INVENTOR.*
KURT R. STADTHAUS.
BY
*G. J. Kessenich + J. H. Church*
ATTORNEYS.

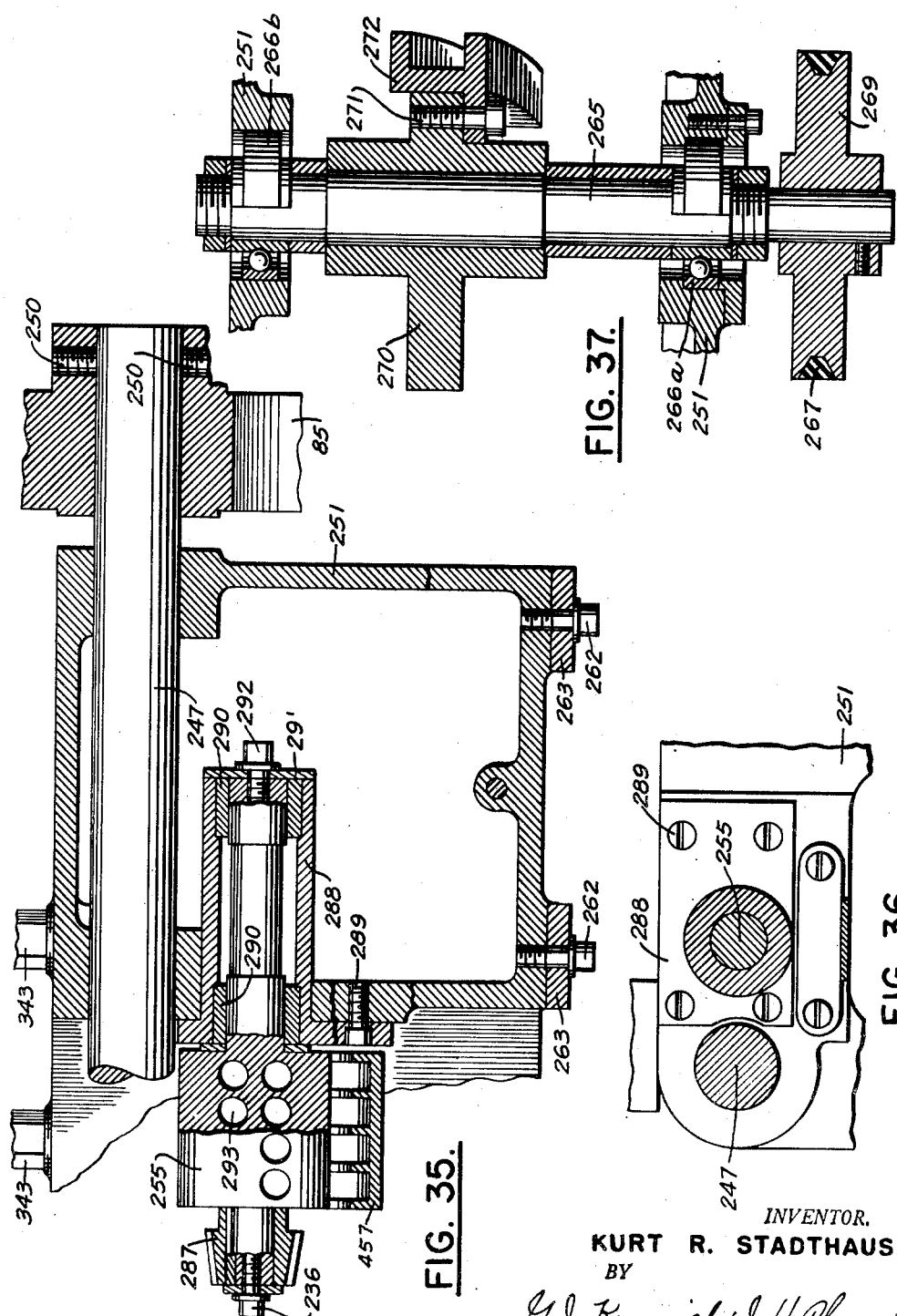

INVENTOR.
KURT R. STADTHAUS.

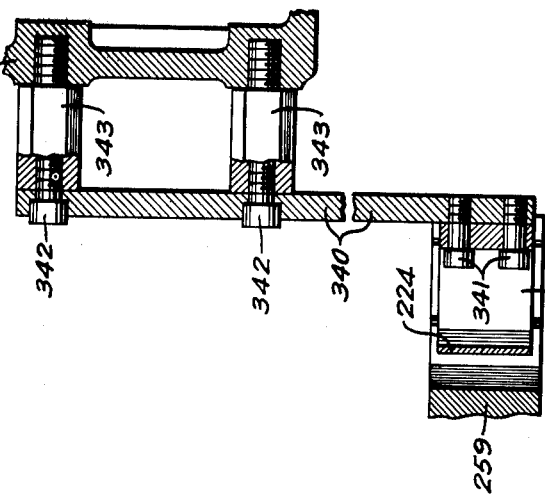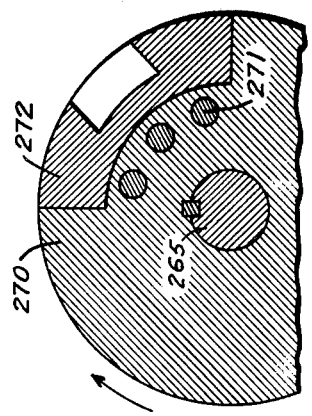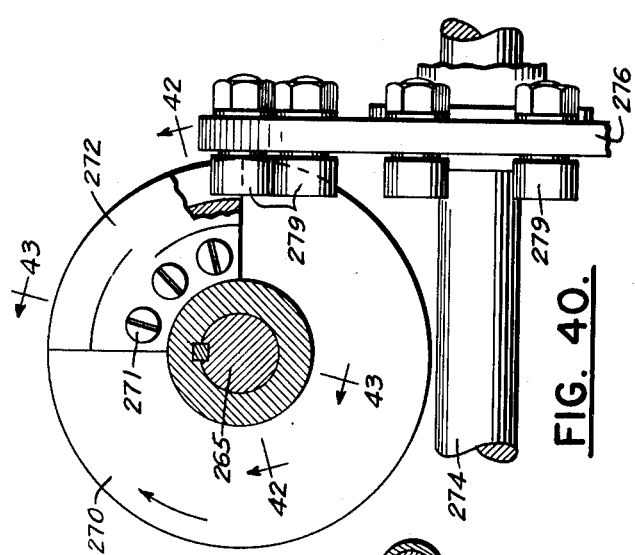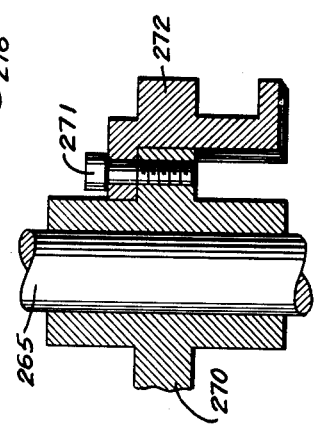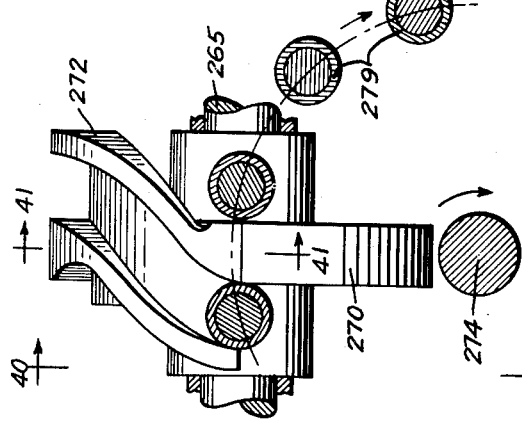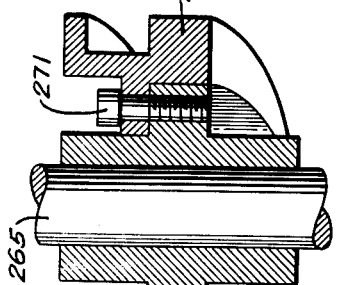

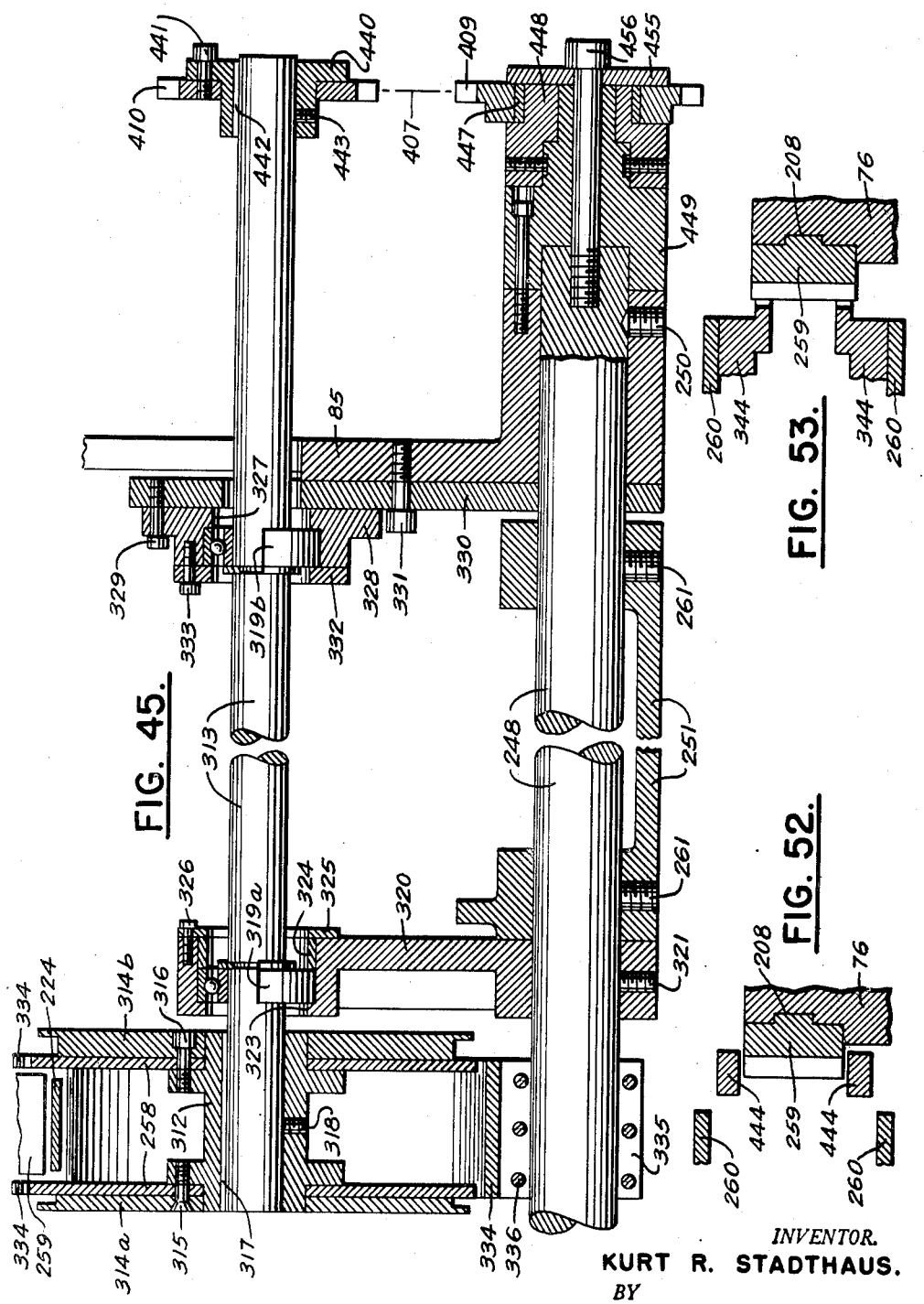

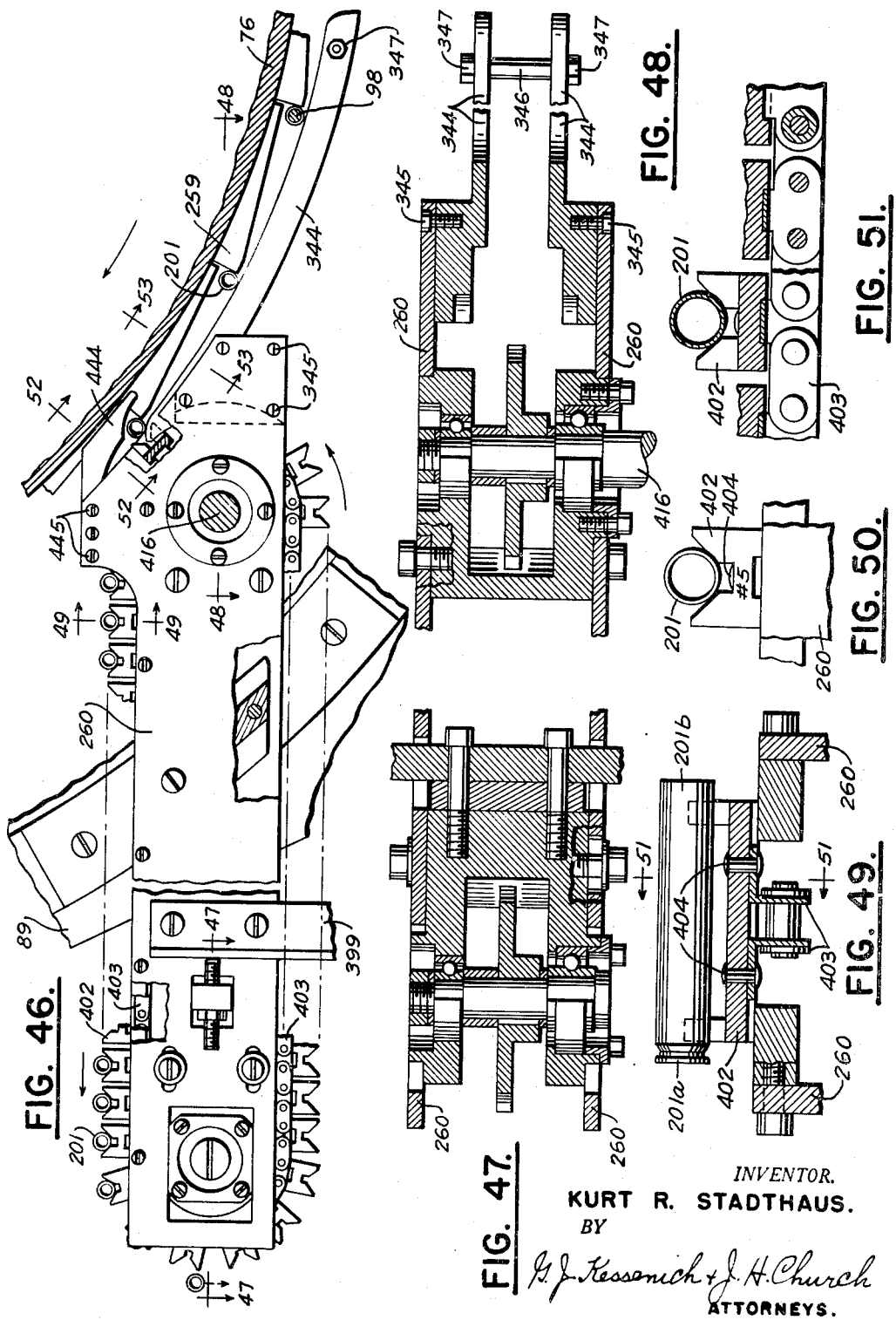

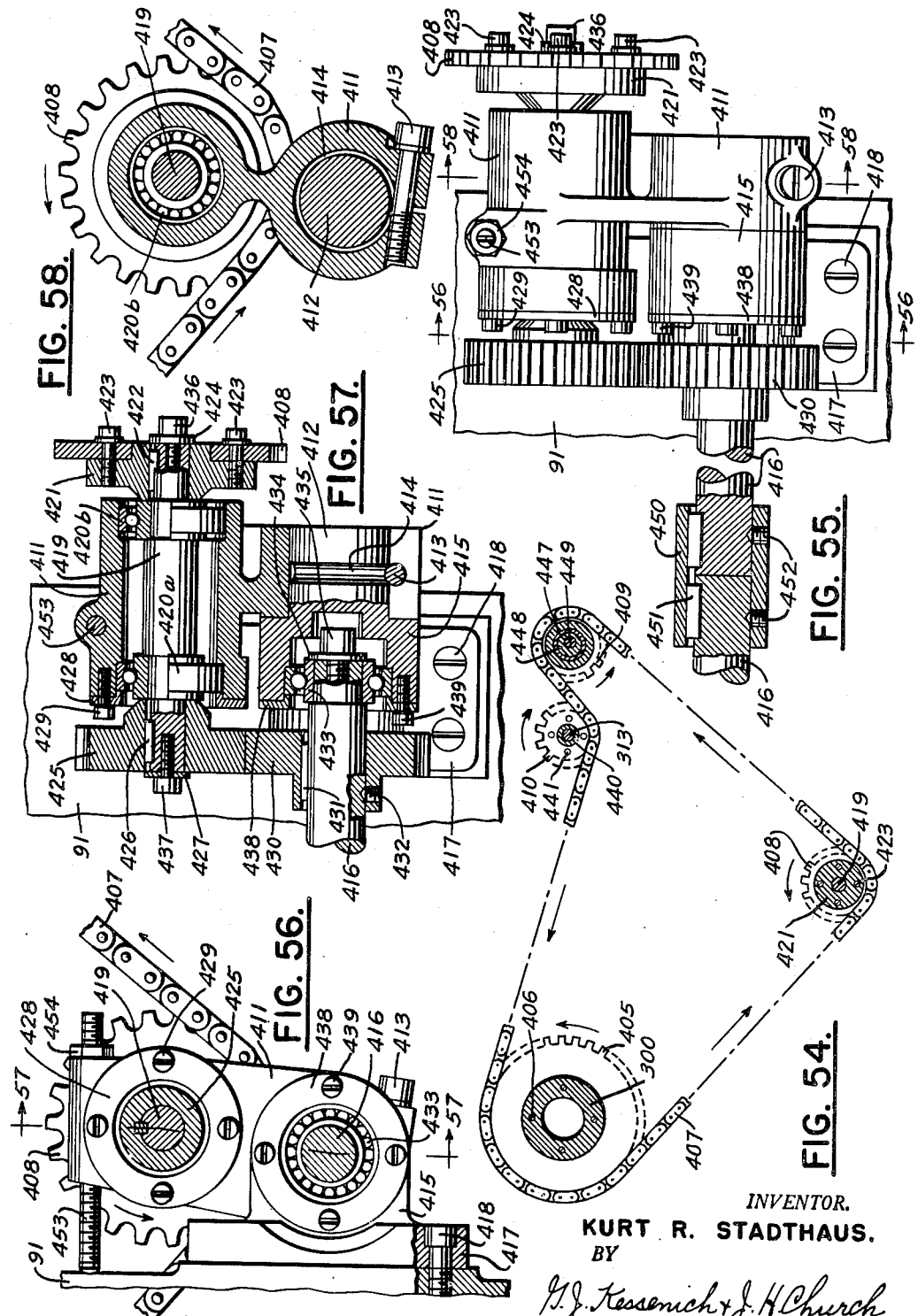

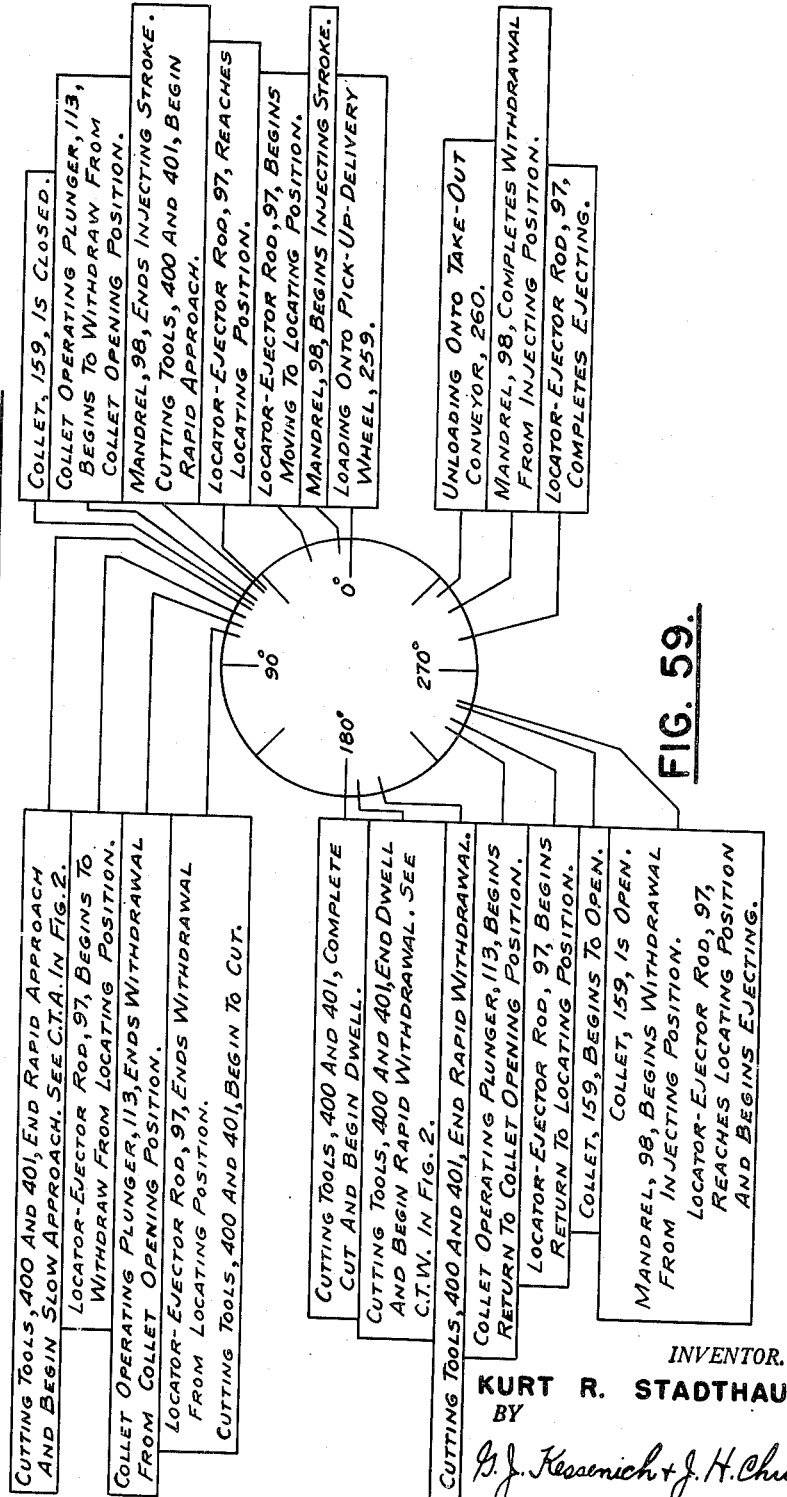

Patented Aug. 12, 1952

2,606,359

UNITED STATES PATENT OFFICE 2,606,359

CONTINUOUS AUTOMATIC MULTISPINDLE LATHE

Kurt R. Stadthaus, Mt. Royal, Quebec, Canada, assignor to General Electric Company, a corporation of New York Application April 2, 1948, Serial No. 18,674

11 Claims. (Cl. 29—1.32)

The invention described herein may be manufactured and used by or for the Government for governmental purposes without the payment of any royalty thereon.

My invention relates to the manufacture of work pieces such as small arms cartridge cases and the like, and it has special relation to continuous operation, automatic multi-spindle lathes for uninterruptedly performing one or more operations on successive work pieces.

Broadly stated, the object of my invention is to provide an improved machine for continuously and simultaneously head turning, trimming, and/or performing other finishing operations on cartridge cases or other work pieces.

Another object is to provide such a machine having the capacity for performing such operations in a qualitatively suitable manner at an exceedingly rapid quantitative rate. My inventive machine is capable of satisfactorily head turning and trimming over 25,000 cartridge cases per hour.

A further object is to provide a machine in which the entire series of work piece movements and operations thereon may be carried on without requiring any part of the machine to be stopped for loading, unloading or indexing operations, thereby making possible maximum efficiency of and minimum strain on the machine.

An additional object is to provide a means for rapidly identifying which of the machine's many cutting tools has become defective and caused a defect in the finished work piece in order that a new tool may be substituted therefor with a minimum delay.

A still further object is to increase the speed and decrease the labor required to perform head turning, trimming or other lathe-type operations on cartridge cases or the like.

In practicing my invention I attain the foregoing and other objects by providing a continuous, automatic multi-spindle machine of unique construction and superior performance. One preferred form of such a machine is shown by the accompanying drawings wherein:

Fig. 4 is a transverse vertical section view, divided up into six circular sectors identified as A to F inclusive, each respectively representing a sector of the stepped-apart transverse sections taken along the lines generally indicated by corresponding letters in Fig. 3;

Fig. 5 is a transverse vertical view taken along line 5—5 of Fig 3 to show in elevation the left side of the machine's turret, some of the parts having been removed to expose some spindle drive and other gears;

Fig. 6 is a sectional view taken along line 6—6 of Fig. 2, and showing the internal construction and mounting of one of the machine's work piece locator and ejector mechanisms;

Fig. 7 is a sectional view taken along line 7—7 of Fig. 4 and showing the internal construction and mounting of one of the machine's collet opening and release mechanisms;

Fig. 8 is a section taken along line 8—8 of Fig. 7 to show certain mating relationships of the slides and mounting for one of the machine's collet opening and release mechanisms;

Fig. 9 is a section view from line 9—9 of Fig. 7 showing the respective forms and mating relationships of one of the machine's work piece locators and collet-operating plunger units;

Fig. 10 is a sectional view taken along line 10—10 of Fig. 4 to show the internal construction of one of the machine's spindle and collet mechanisms, as well as some of the gears and mountings for those parts;

Fig. 11 is a lengthwise vertical section through one of the mandrels and associated parts used to load work pieces into the machine's spindle and collet mechanisms, the view being that which would be exposed to the operator upon sectioning the mandrel, etc. shown at the top of Fig. 3;

Fig. 12 is a section taken along line 12—12 of Fig. 11 to show the support for the mandrel, the work piece stripper bushing, and the construction of the slide in which the mandrel supporting member travels;

Fig. 13 is a section taken along line 13—13 of Fig. 11 to show details of the left end of a ball-bearing mounting which slidably supports the work piece-loading mandrel;

Fig. 14 is a section along line 14—14 of Fig. 11 showing the right end of the mandrel-support illustrated in Fig. 13 as well as the relationships of that support with other parts of the machine;

Figure 1:
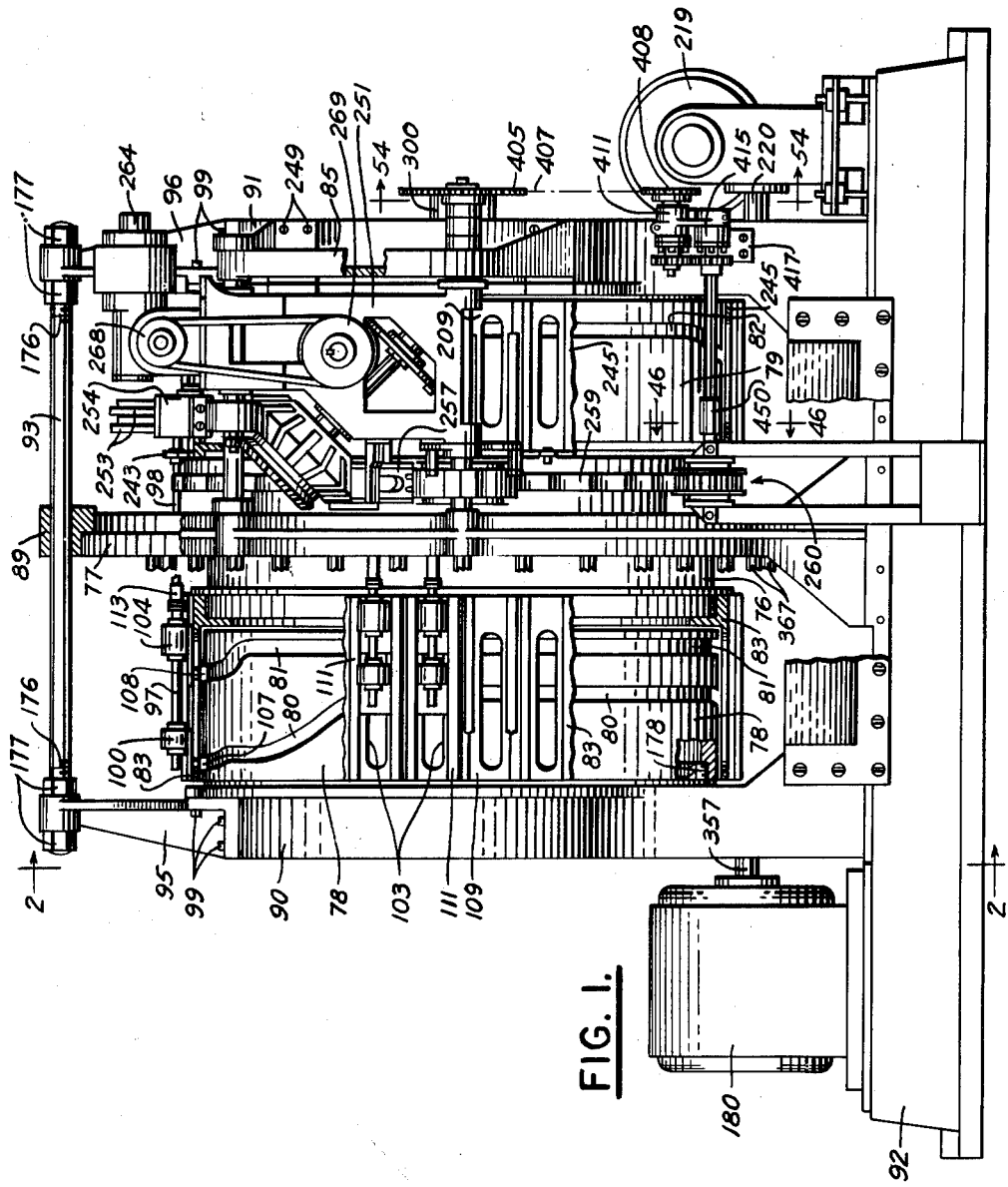
Fig. 1 is an elevation view of the front or "operator's view" of the entire machine, some of the parts either having been removed or only fragments thereof illustrated in order to show the structure and general relationships of the various parts.
Figure 3:
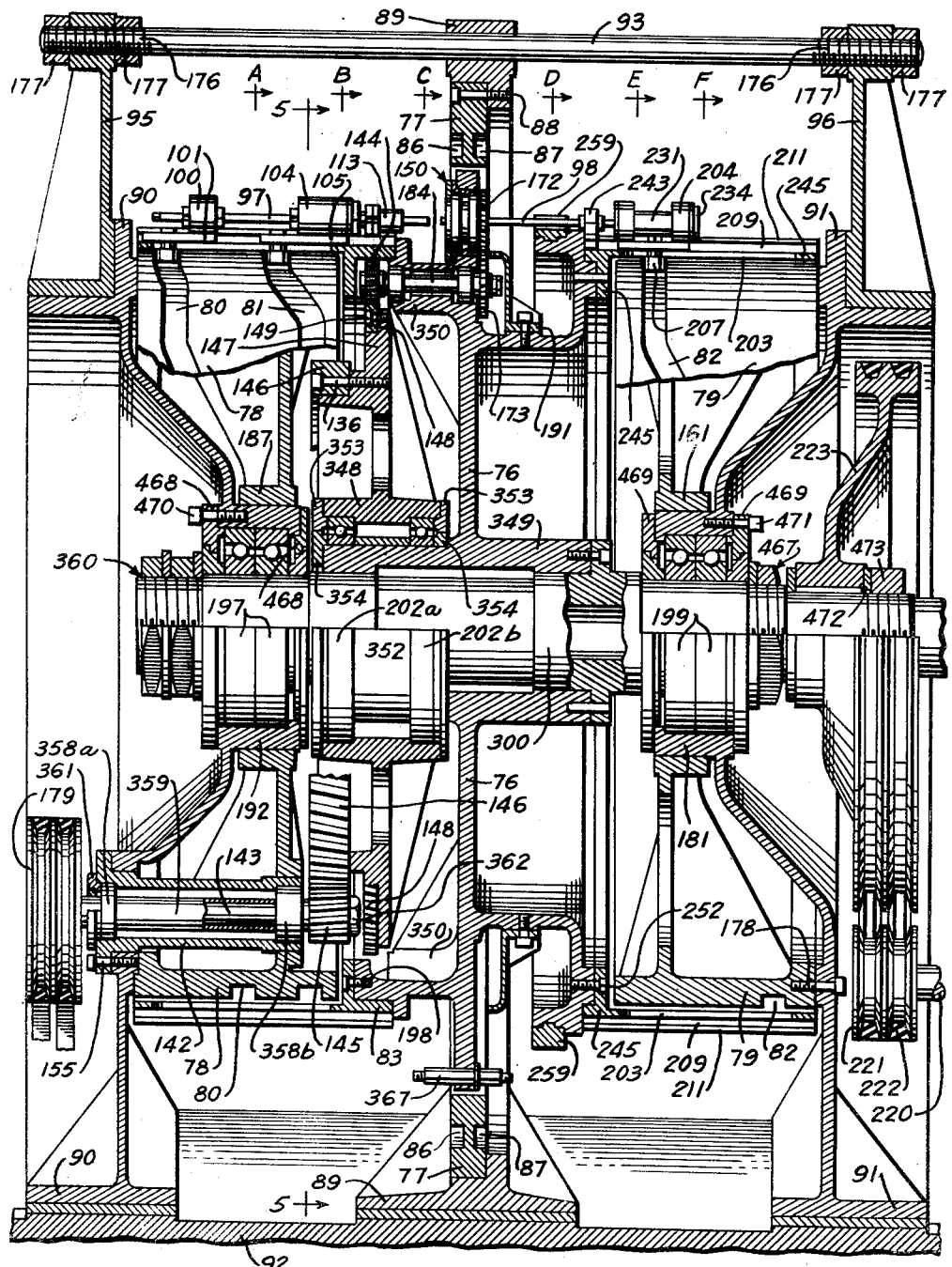
Fig. 3 is a lengthwise, substantially vertical section view taken along line 3—3 of Fig. 2 to show the principal shafts, gears and other cooperating parts of the machine.
Figure 16:
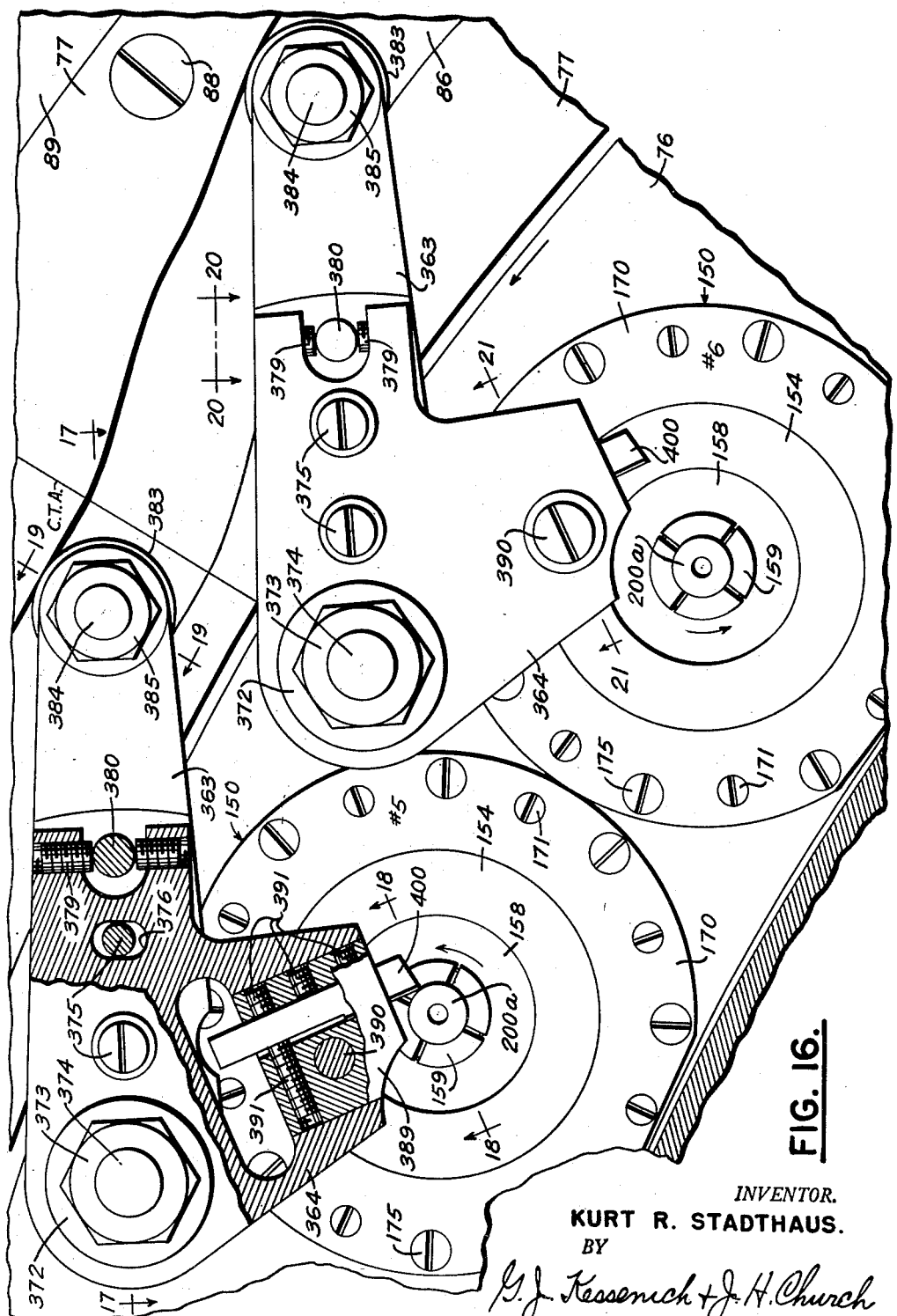
Figure 25:
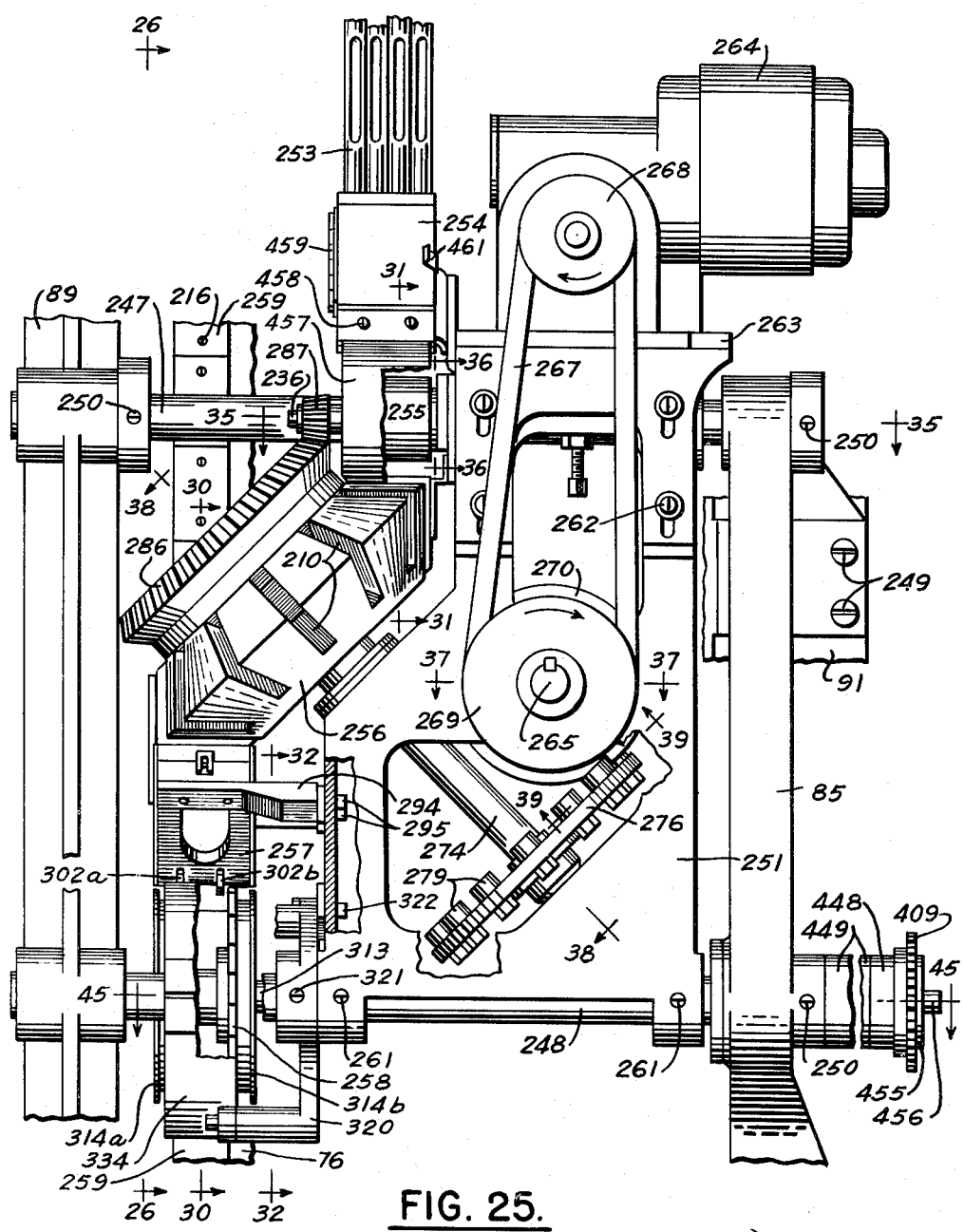
Figure 31:
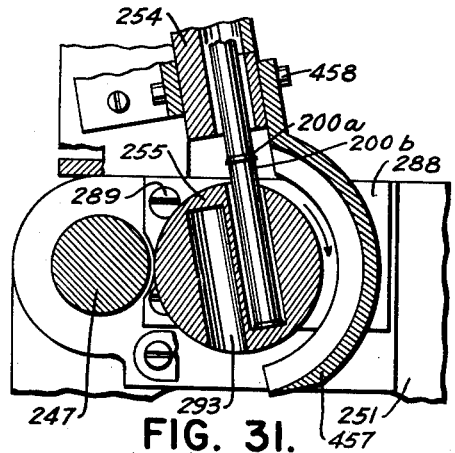
Figure 31A:
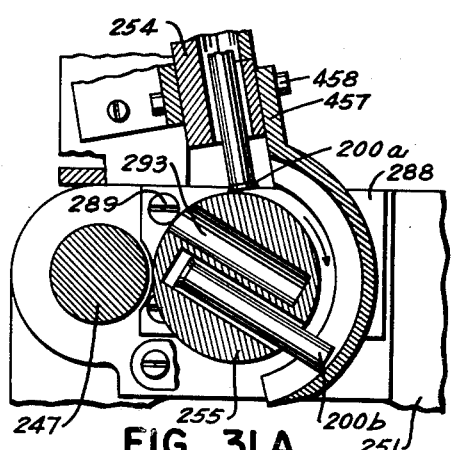
Figure 31B:
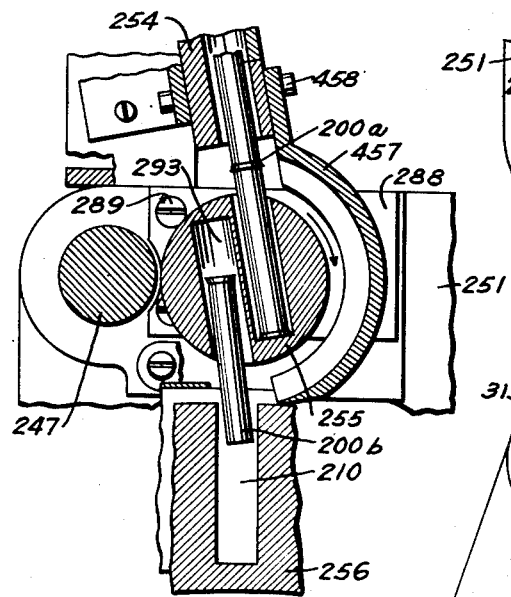
Figure 32:
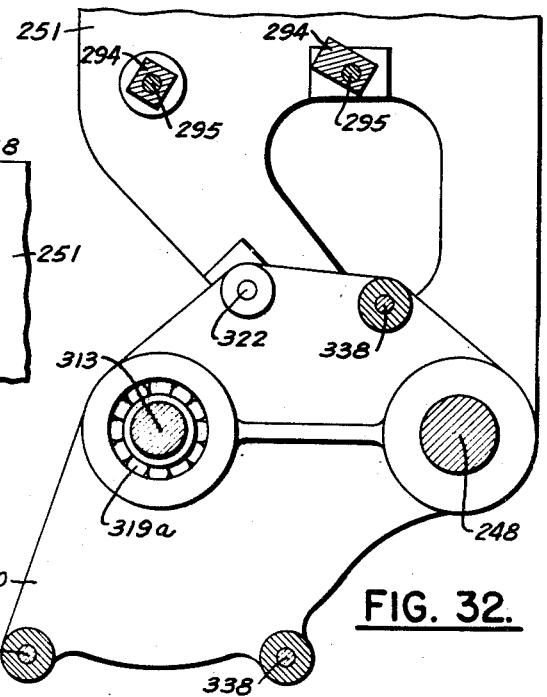
Figures 33, 34:
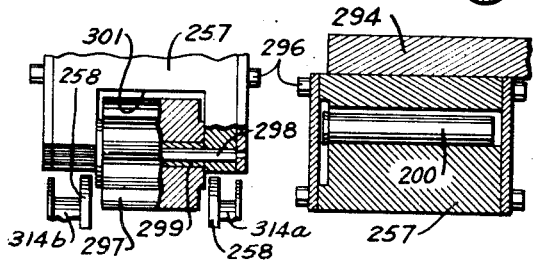
Figure 38:
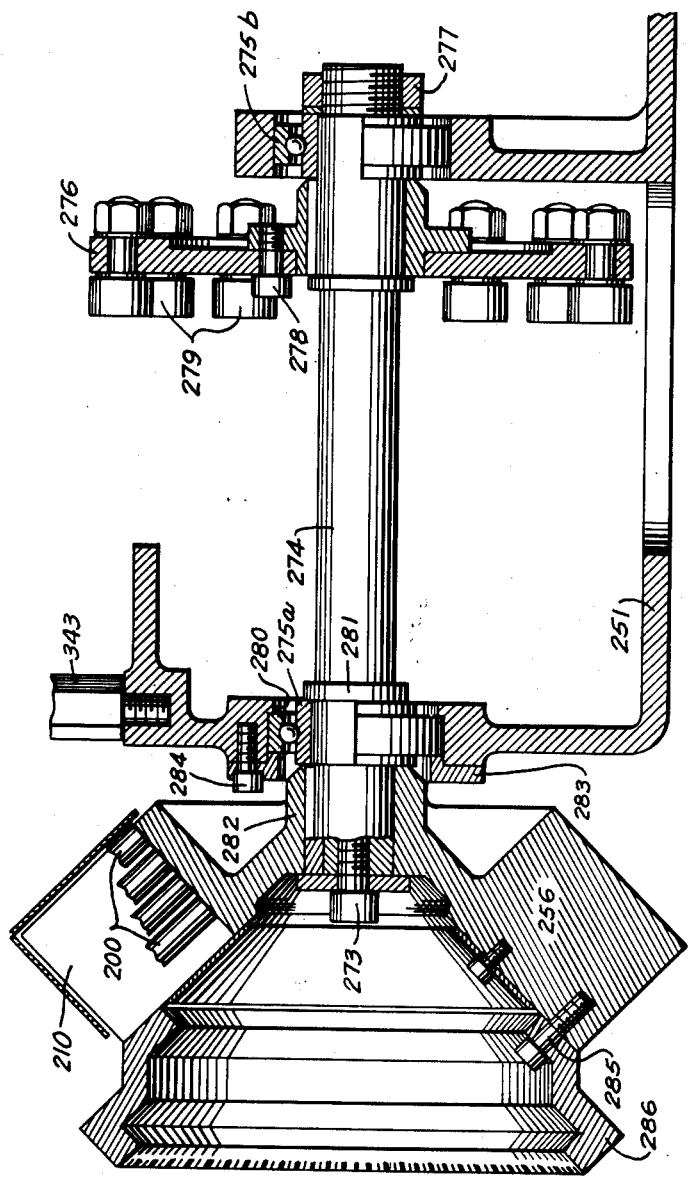

Fig. 15 schematically shows the respective operating positions of the work-loading mandrel and supporting member therefor, an unfinished work piece resting on the delivery wheel prior to injection into the spindle and chuck therefor, the chuck release mechanism and the work locator-ejector mechanism, as these parts would appear to the operator facing the machine as shown in Figs. 1 and 3. In this view, the work locator-ejector mechanism is shown protruding from the spindle, a condition which occurs when the finished work piece has just been ejected from the spindle thereby;

Fig. 15A is a view similar to but showing the next succeeding step after Fig. 15, the slidable mounting which bears the locator-ejector mechanism having been completely retracted away from the spindle;

Fig. 15B shows the step which succeeds that of Fig. 15A, the work-loading mandrel having injected into the spindle and collet the work piece which had been resting on the delivery wheel;

Fig. 15C shows the next succeeding step, the collet release mechanism having been withdrawn out of contact with the collet which thereby is enabled to close around the work piece;

Fig. 15D shows the tools which are next brought into contact with the work piece after the Fig. 15C step;

Fig. 15E shows the last step of the operating sequence wherein the finished work pieces have been pushed by the locator-ejector mechanism out of the spindle and collet onto the delivery wheel;

Fig. 16 is an actual full-size plan view, partially in section, of two of the machine's tool holders and spindle-collet assemblies located on the left side of the machine as shown in Fig. 5;

Fig. 17 is a section taken along line 17—17 of Fig. 16 to show in actual full-size detail the construction of one of the tools shown in Fig. 16, its connection to the turret, its roller-connection with one side of the machine's bilaterally grooved face cam, and likewise depicting the counterpart of that tool connected thereto on the other (or right) side of the said turret;

Fig. 18 is a view taken along line 18—18 of Fig. 16 to show a fragment of one end of a typical work piece which can be acted on by the instant machine, in this instance a small arms cartridge case, and of a head turning tool which has not yet contacted the case;

Fig. 18A illustrates the finished form given to the cartridge case of Fig. 18 after being acted upon by the head turning tool;

Fig. 19 is a section taken from line 19—19 of Fig. 16 and showing the manner in which the tool holder is roller-connected to the face cam;

Fig. 20 is a plan view looking down along line 20—20 of Fig. 16 and illustrating the bi-segmented nature of the tool holder, and also showing the situs of one of the holder adjusting screws shown in Fig. 16;

Fig. 21 is a section taken along line 21—21 of Fig. 16 to show the internal construction of the Fig. 16 tool holder and the block for holding the tool therein;

Fig. 22 is an actual full-size plan view, complementary to that of Fig. 16 but taken from the opposite (or right) side of the turret, the tool holders in both of said views being connected to each other by a common tool post member passing through the turret as shown in Fig. 17;

Fig. 23 (on Sheet 2) is a section taken along line 23—23 of Fig. 22 to show the internal construction of the Fig. 22 tool holder and the mechanism by which the holder may be adjusted for the cutting of work pieces of different lengths;

Fig. 24 (on Sheet 4) is a view taken from line 24—24 of Fig. 22 to show the shape of the mouth trimming tool and the mouth end of the cartridge case (the same case as shown by Figs. 18—18A) to be trimmed thereby;

Fig. 24A illustrated the manner in which the Fig. 24 work piece is trimmed, showing the specially provided groove in the mandrel which permits the trimming to be accomplished without harming the mandrel;

Fig. 25 is a "close-up" or enlarged elevation view of the front or "operator's view" of the machine's principal work piece feeding or delivery apparatus;

Fig. 26 is a view in side elevation of the same general apparatus taken from line 26—26 of Fig. 25;

Fig. 27 is a top plan view taken from line 27—27 of Fig. 26 to show the work piece receiving magazine, in the illustrated example equipped to receive four continuous lines of work pieces simultaneously from a rotative pin-type feed hopper (not shown);

Fig. 28 is a section taken along line 28—28 of Fig. 26 to show the two-part construction of the receiving magazine, depicting its hinged cover and spring retaining member therefor;

Fig. 29 is a section taken along line 29—29 of Fig. 26 to show the manner of attachment and support for the initial receiving or feeding magazine;

Fig. 30 is a transverse vertical section view taken along line 30—30 of Fig. 25 to show details of the machine's loading magazine, loading wheel, and delivery wheel;

Fig. 31 is a section taken along line 31—31 of Fig. 25 to show the manner in which a row of four work pieces (cartridge cases) drop from the feeding magazine into the "turn-over" wheel (since the view is taken from one side, only one of the rows of work pieces can be seen);

Fig. 31A is a similar view except that the "turn-over" mechanism is shown rotated to an intermediate position between Figs. 31 and 31B;

Fig. 31B is similar to Fig. 31 except that the "turn-over" mechanism has been rotated 180° so that the row of four work pieces therein simultaneously drops out and into the transfer wheel therebelow while a row of four more work pieces drops into the "turn-over" wheel from the feeding magazine thereabove;

Fig. 32 is a section view taken along line 32—32 of Fig. 25 and showing the positional relationship of several of the machine's shafts, including the drive shaft for the loading wheel;

Fig. 33 is a view taken from line 33—33 of Fig. 26 to show the general construction of the loading magazine;

Fig. 34 is a section taken along line 34—34 of Fig. 26 through the loading magazine to show certain details of its internal construction;

Fig. 25 is a section taken along line 35—35 of Fig. 25 and shows the internal construction of the "turn-over" mechanism, the pinion gear by means of which that mechanism receives its motivation, and a housing and shaft used for supporting some of the machine's feeding components;

Fig. 36 is a view taken along line 36—36 of Fig. 25 to show the manner in which the housing for the "turn-over" wheel's shaft is attached to the main supporting housing, and also to show the attachment of the guard for the transfer wheel;

Fig. 37 is a sectional view taken along line 37—37 of Fig. 25 from the front towards the back of the machine to show the sheave, camshaft and part of the cam which together are responsible for the intermittent motion of the transfer wheel;

Fig. 38 is a section taken along line 38—38 of Fig. 25 through the transfer wheel, its shaft and supporting structures;

Fig. 39 is a view taken from line 39—39 of Fig. 25 to generally show the specially shaped cam which controls the intermittent movement of the loading wheel, and further to show the respective relationships of the transfer wheel shaft, the disc which mounts the special cam, and the cam follower rollers;

Fig. 40 is another view of the same or analogous parts shown in Fig. 39, being taken along line 40—40 of Fig. 39;

Fig. 41 is a section view taken from line 41—41 of Fig. 39 to show the 90° extent of the special cam and the means of the cam's attachment to the cam disc;

Fig. 42 is a section view taken from line 42—42 of Fig. 40 to show further details of the special cam, the cam disc and the supporting shaft;

Fig. 43 shows further details of the same parts as shown in Fig. 42, the view in this instance being taken from line 43—43 of Fig. 40;

Fig. 44 is a section taken along line 44—44 of Fig. 26 to show the retaining strip or guide bar used to prevent work pieces from falling off the delivery wheel, and further showing attachment means for said strip;

Fig. 45 is a section taken along line 45—45 of Fig. 25 to show the general internal structure and relationship of the loading wheel, its drive shaft, and the lower front supporting shaft for the machine's main housings;

Fig. 46 is an elevation view of the right side of the machine's work piece take-off conveyor as same appears from line 46—46 of Fig. 1;

Fig. 47 is a section taken along line 47—47 of Fig. 46 through the front end of the take-off conveyor, the link chain and V-blocks or troughs thereon having been removed;

Fig. 48 is a corresponding section view through the rear end of the take-off conveyor, having been taken along line 48—48 of Fig. 46;

Fig. 49 is a section taken along line 49—49 of Fig. 46 to show the manner in which each of the V-shaped troughs on the conveyor's link chain supports a work piece thereon;

Fig. 50 is an enlarged side elevation view of one of the V-shaped troughs showing how they may be numbered (in this illustration it's #5) for use in identifying and associating the finished work piece thereon with a particular, correspondingly numbered spindle and tool which acted on that work piece.

Fig. 51 is a section taken along line 51—51 of Fig. 49 to show further details of the conveyor link-chain and V-blocks;

Fig. 52 is a section taken along line 52—52 of Fig. 46 to show the relationship of certain conveyor parts to the delivery wheel;

Fig. 53 is a similar section taken along line 53—53 of Fig. 46 showing the relationship of the delivery wheel and other parts of the conveyor;

Fig. 54 is a transverse vertical view, taken along line 54—54 of Fig. 1 to show the sprocket wheel attached to the main drive shaft, and also the sprockets and chain connected thereto which transmit the motive power from that drive shaft for driving the take-out conveyor and the loading wheel;

Fig. 55 is a greatly enlarged front elevation view of the take-out conveyor driven mechanism shown in Fig. 1;

Fig. 56 is a transverse vertical view taken along line 56—56 of Fig. 55 to show certain structural details of the conveyor drive mechanism;

Fig. 57 is a section taken along line 57—57 of Fig. 56 to show the internal construction of the conveyor drive mechanism;

Fig. 58 is a transverse vertical section view taken along line 58—58 of Fig. 55 to show means for adjusting the position of the conveyor drive mechanism; and Fig. 59 is a schematic diagram showing the radial or angular relationships between the successive steps which comprise the machine's cycle of operation as viewed from the left end of the machine.

THE COMPLETE MACHINE

The complete machine is principally illustrated by Fig. 1, with certain major portions thereof represented in Figs. 2 to 5, inclusive. Referring, then, to these first five figures, it will be seen that the machine has a large base portion 92 upon which are erected a left end main support member 90 and a right end main support member 91. Approximately midway between the two end members is a center main support member 89. The three named members 89—90—91 are fastened by screws 94 (see Fig. 2) and by other means at their lower extremities to the machine's base 92.

Figure 2:
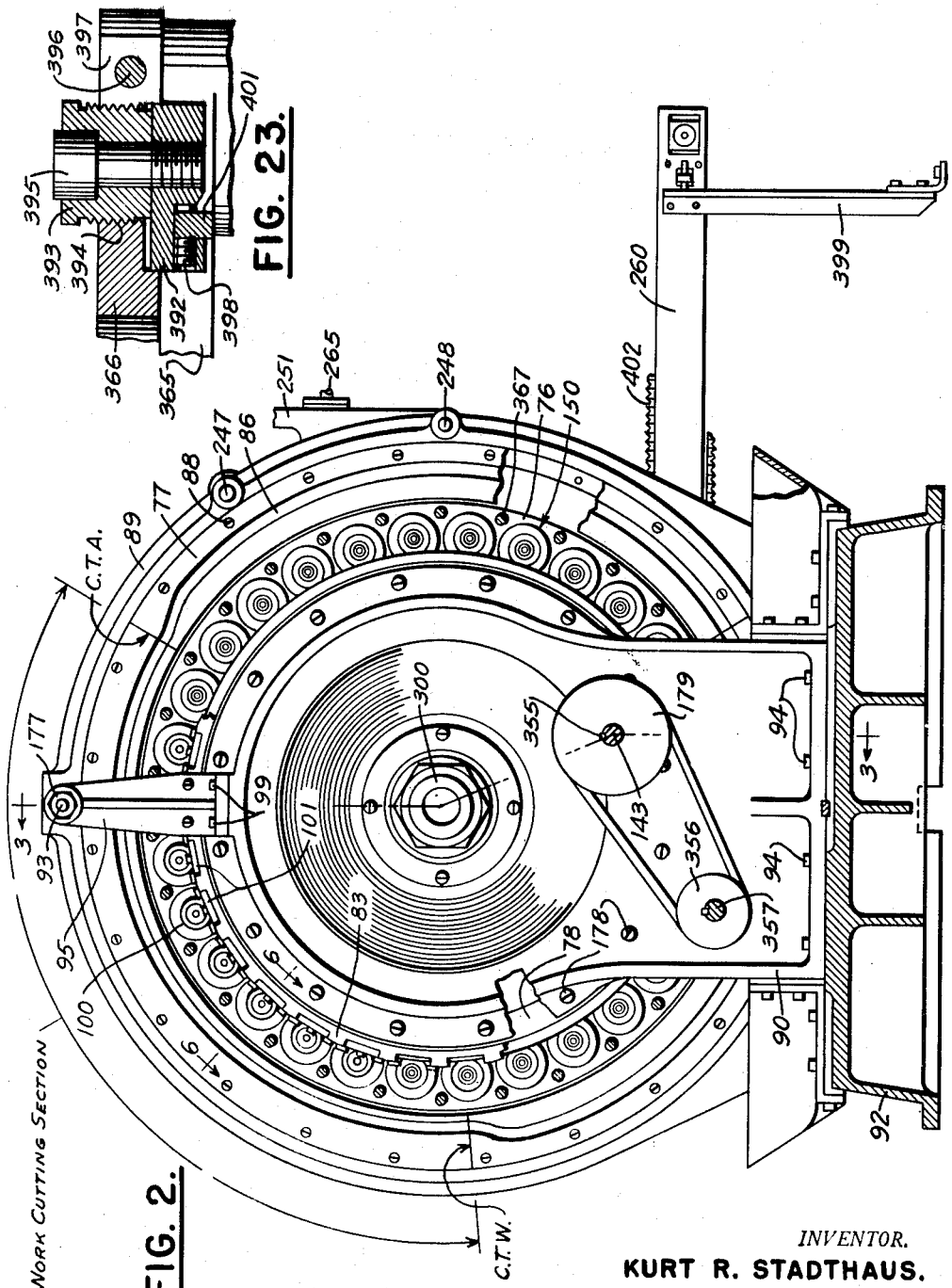
Fig. 2 is an elevation view of the left side of the machine, i. e. the side which is on the left of the operator who faces the machine as it appears in Fig. 1.

For purposes of description it may be said that the two end support members 90—91 have a somewhat "key hole" shape best illustrated in Fig. 2. Both these members are considerably shorter than the intermediate support member 89. However, extending upwards from the top of each support member 90—91 is a bracket, respectively identified as 95—96 in the drawings, which serve to extend the overall height of members 90—91 to equal that of member 89. These two brackets are attached to the end support members by screws generally indicated at 99 in Figs. 1—2. The upper extremities of these brackets end in an expanded cylindrical portion having an opening extending therethrough on a horizontal plane identical with that of an opening which extends through the upper extremity of the intermediate supporting member 89. A tie bar 93 extends through the just described openings in brackets 95—96 and support member 89, serving to brace the machine's three main vertical supports in proper fixed relationship to each other. Both ends of the tie bar 93 bear threads 176. Attached to these threads on opposite sides of the expanded portions of brackets 95 and 96, respectively, are lock nuts 177 which serve to hold the tie bar fixed in its illustrated position.

The intermediate supporting member 89 is substantially cylindrical in shape and serves, among other things, to house a substantially circular face cam 77. Radially inward with respect to the face cam, and in alignment therewith is situated the substantially peripheral portion of a vertical revolving turret 76. Essentially, this turret 76 is wheel-shaped but has a number of laterally projecting portions which gives its cross section the irregular appearance shown in Fig. 3. As there illustrated the turret is mounted (in a manner later to be described in more detail) so as to revolve with the main drive shaft 300.

This main shaft 300, as best seen in Fig. 3, is supported at its two ends for rotatable movement by two sets of ball bearings 197 and 199, respectively, which are mounted within corresponding bosses 192 and 181 extending from the central dished in portions of the machine's vertical end support members 90—91. The outer races of these ball bearings are respectively secured to members 90—91 by pairs of retaining plates 468—469, assisted by screws 470—471 as shown in Fig. 3. The left extremity of main shaft 300 is threaded to accommodate lock nuts and washers (generally indicated by 360) which serve to prevent movement to the left of parts mounted on the shaft. A similar threading, nuts and washers (generally indicated by 467) is furnished nearer the shaft's right end to prevent movement to the right of parts mounted on the shaft.

Mounted in the turret, all equidistant from the turret's center of rotation, are a series of spindle assemblies 150. These assemblies bear collet mechanisms 158—159 for receiving and holding the work to be acted upon by the machine, the collets being rotatable by gearing mechanisms later to be described in detail. The gears which directly effect this collet rotation are each rotatably mounted in the turret 76, the said gears meshing in turn with other gears supported by a spider 147 which, because of an attachment to the hub 349 of the turret, is able vertically to rotate about but independent of the main shaft 300. The details of this gear chain will be set forth below; however, it may be said at this point that the entire chain of gears which cause the collets 159 in the spindle assemblies 150 to rotate are driven by the spider drive pinion shaft 143 which, in turn, with the aid of a sheave connection generally indicated at 179, is driven by motor 180.

Situated between the left support member 90 and the intermediate support member 89 is a left cylinder cam 78 which bears the cam grooves 80—81 (see Figs. 1, 3). Situated between the right end support member 91 and the intermediate support member 89 is a right cylinder cam 79 which bears thereon a single cam groove 82 (see Figs. 1, 3). These two cylinder cams 78—79 each has a web-like internal supporting structure radially extending from the cams' internal peripheries to hub portions (187 and 161, respectively) which rest on the corresponding bosses 192 and 181 therefor provided by the dished-in portions of the respective end support members 90—91. Serving to secure the cylindrical cams to the corresponding end support members 90—91, which Figs. 1—2—3 depict, is a ring of screws 178 (see Fig. 3) for each.

Encircling left cylinder cam 78 is a slide support ring 83 which is fastened to turret 76 by means of a ring of screws 198 thereby enabling support ring 83 to rotate with the turret. Encircling right cylinder cam 79 is a similar slide support ring 245 which is fastened to turret 76 by means of a ring of screws 252 thereby enabling support ring 245 likewise to rotate with the turret. The left slide support ring 83 bears a number of successive longitudinal tracks 109 and guide strips 111 (see Fig. 1) across the ring's face which together serve slidably to support on each such track a work piece locator and ejector mechanism 100—101 and a collet opening and release mechanism 104—105. The tracks 109 are so placed that the mechanisms located thereon are axially aligned with the axis of a corresponding spindle assembly 150 located in the turret 76. Likewise, the right slide support ring 245 bears a number of successive longitudinal tracks 209 and guide strips 211 which together serve slidably to support on each such track a work piece injector mechanism 204—205.

The abovementioned main drive shaft 300 is driven by a sheave and belt linkage with a motor 219. As reference to Figs. 1, 3 will show, motor 219 turns shaft 220 which in turn rotates a multigrooved sheave 221. This sheave is linked by means of a number of belts 222 to another sheave 23 which is rotatably mounted upon the main drive shaft 300 and there secured by means of a washer 472 and a nut 473 threadedly attached to the shaft as shown in Fig. 3.

The general assembly view of Fig. 1 illustrates in broad outline the various means by which work pieces are received from a hopper (not shown) and, at prescribed intervals, are fed one by one in proper position to be injected by the work piece injector mechanisms 204—205 into the spindles 154 carried by turret 76. All of the parts and some of the details of the machine are not shown by Fig. 1 but are represented in many of the other views. However, Fig. 1 does shown the following: a series of feed tubes 253, of which the illustrated machine has four, leading from the hopper (not shown); a work piece magazine 254; a turnover wheel 255 which receives the work pieces and inverts them so that they may properly fall into the next part which is the transfer wheel 256; the loading magazine 257 into which the work pieces go from transfer wheel 256; the loading wheel 258 which next receives the work pieces; and lastly the segmented structure which, in its composite form, may be termed a pick up and delivery wheel 259. It is this pick up and delivery wheel (hereinafter to be simply termed "delivery" wheel) which conveys the work pieces into a proper position for the work injector mechanisms to thrust the work pieces into the turret's work carrying spindles. The just named members which effect the delivery of the work pieces from the hopper (not shown) to the spindles 154 in housing 76 are not all identified by reference characters in Fig. 1 because of lack of room, but they are well illustrated and identified in Figs. 25-31 inclusive. Their detailed operation will be described below.

Still other parts of the machine will later be described in order to make the various working interrelationships become clear. For example, there is provided a work piece take-out conveyor 260 whose chain belt construction is generally shown in Fig. 1 and in more detail by Figs. 46–53 inclusive.

THE WORK PIECE FEEDING AND LOADING MECHANISMS

In the illustrated embodiment of my unique, automatic, multi-spindle machine, the various parts are adapted to act upon small arms cartridge cases. It will be obvious to those skilled in the art that the machine can be so designed or adapted as to accommodate any given size cartridge case, or in fact almost any type of substantially longitudinal object which can conveniently undergo conventional lathe operations such as turning, trimming, cutting, chamfering, etc.

The members which comprise the work piece feeding mechanism, shown in general relationship to the entire machine by Fig. 1, are illustrated in full detail by Figs. 25-45 inclusive. As reference to those drawing views will show, the various members of the feed and loading mechanism are principally supported by an upper stationary shaft 247 and a lower stationary support shaft 248. These two shafts extend transversely across part of the machine and are themselves supported on the left by the machine's intermediate vertical support member 89 and on the right by a bracket 85 which is fastened by screws 249 to the machine's right end support member 91. Shafts 247, 248 are fixed in the described positions by means of set screws 260.

A substantially rectangular support member 251 (see Fig. 25) is mounted on shafts 247 and 248, the former passing through cylindrical openings provided at the upper extremity and the latter passing through cylindrical openings provided at the lower extremity of member 251. Serving to fix the support member 251 in the described position are set screws 261. Attached to the side of the uppermost end of member 251 by means of screws 262 is an L-shaped bracket 263 which serves to mount a motor 264.

The feeding magazine

The feeding magazine 254, into which the work pieces first enter from the feed tubes 253 is well illustrated in Figs. 25-29 inclusive. This magazine has a somewhat boxlike construction formed of a relatively long stationary base and a shorter swinging "trouble door" each of which has a series of semi-circular grooves. When the door portion is closed these grooves mate to form cylindrical passages which are continuous with the feed tubes 253 from above (see Fig. 27), and coincide with holes 293 in the turnover wheel below. The magazine's door portion swings about a hinge 459, which is secured to the magazine's two halves by screws 460. This door, whose purpose is to provide access for removing cartridges that enter in an inverted position, is held in the closed position by a spring latch 461 which is attached to the magazine's base portion by screws 462.

The feeding magazine is supported in the illustrated position by means of two right-angled brackets 463—464. Bracket 463 is secured to support member 251 by screws (not shown); and bracket 464, which is supportingly attached to the magazine by screws 465, is in turn secured to bracket 463 by means of screws 466.

The turnover and transfer wheels

A clockwise rotatable shaft 265 extends horizontally through support member 251 from the front to the rear (see Figs. 25 and 37). This shaft 265 is supported for such rotation by means of a pair of ball bearings 266a—266b. Rotative movement is imparted to shaft 265 from motor 264 by means of belt 267 and connected sheaves 268—269. Mounted on shaft 265 is a wheel 270 to which is attached, by means of screws 271, a cam 272 whose shape approximates a 90° helical segment (see Figs. 37 and 39-43 inclusive). The purpose of cam 272 will be made clear after other parts associated therewith are described.

Supported by member 251 at the oblique angle shown in Fig. 25 is the transfer wheel 256 which has a number of equally spaced grooves 210 extending radially inward from the periphery (see Figs. 25, 38). As reference to those drawings will show, the transfer wheel is keyed to a rotatable shaft 274 and further fastened thereto by means of screw 273. Shaft 274 is supported for rotation within member 251 by means of a pair of ball bearings 275a—275b. The lowermost of ball bearings 275a—275b, as well as a cam follower wheel 276, are retained in the position indicated by Fig. 38 by means of a nut 277 which is threadedly attached to shaft 274. The cam follower wheel 276 is of two-piece construction, the parts thereof being fastened together by means of screws 278. Wheel 276 bears a ring of cam followers 279 which co-act with cam 272 (see Figs. 39—40) to accomplish a desired transmittent rotation of shaft 274.

The means by which the transfer wheel supporting shaft 274 and parts carried thereby are mounted in support member 251 immovable except for the shaft's rotation are as follows. The uppermost oblique portion of support member 251 in which shaft 274 rests has a shouldered recess 280 which is shaped to seat ball bearing 275a. The lower face of the inner race of ball bearing 275a rests upon a shoulder portion 281 of shaft 274. Shoulder 281, together with the hub portion 282 of transfer wheel 256, serves to maintain ball bearing 275a in its Fig. 38 position on shaft 274. Hence, when this ball bearing rests in shouldered recess 280, the fastening of a retainer plate 283 by means of screws 284 serves rotatably to secure shaft 274 and all parts supported thereby in support member 251.

Fitted within and secured by means of screws 285 to transfer wheel 256 is a turnover wheel drive gear 286 (see Figs. 25, 26 and 38). This gear 286 drives a pinion gear 287 thereabove which is keyed and attached by means of a screw 236 to the left end stud portion of the turnover wheel 255. Turnover wheel 255, whose details are best illustrated by Fig. 35, is situated between the lower end of feeding magazine 254 and the uppermost part of the just described transfer wheel 256. The turnover wheel has a right end stud portion which is rotatably supported within a housing 288 that is fastened by means of screws 289 to the rectangular support member 251. The rotatable assembly of the turnover wheel's stud portion within housing 288 comprises a pair of spaced bushings 290, a retaining plate 291, and a screw 292. The principal portion of turnover wheel 255 will be seen by Figs. 31 and 35 to contain two parallel rows of blind holes 293, the openings of the two rows being diametrically opposed to each other. In the illustrated embodiment the two rows each contain four holes, one for each of the illustrated four feed tubes 253 which simultaneously bring four work pieces into the machine. Serving to retain the work pieces in the turnover wheel until it rotates, as earlier described, a distance 180° from the position where the work is received by the wheel, is a retaining guide 457 which is secured to feeding magazine 254 by screws 458. This guide 457 is arcuately shaped and has four parallel grooves which face inwardly in alignment with the four-holed rows in the turnover wheel (see Fig. 35).

The loading magazine

The earlier mentioned work piece loading magazine 257 which receives work pieces from transfer wheel 256, has a pair of supporting arms 294 which are attached by means of screws 295 to support member 251 (see Figs. 25, 32). Loading magazine 257, in the illustrated embodiment, is comprised of a front and rear member which, together with two end plates fastened thereto by means of screws 296 (see Figs. 26, 33, 34), form a boxlike construction having a steplike channel extending substantially vertically therethrough (see Figs. 26, 30). At the lower extremity of the loading magazine there is provided a peripherally grooved straightening wheel 297 which is supported by a pin 298 and bushing 299 intermediate the two end plates of the loading magazine for rotatable movement within a specially cut away portion 301 therefor (see Figs. 30, 33). Cooperating with straightening wheel 297 in delivering the work pieces one by one from loading magazine 257 to loading wheel 258 is a pair of latch members 302a and 302b. These latch members (see Figs. 25 and 30) are spacedly mounted to pivot on a pin 303 which extends transversely through the main body portion of loading magazine 257. These latch members serve to prevent free issuance of the work pieces which emanate from the loading magazine 257, being constantly urged into this restraining position by means of a pair of springs 304a and 304b, one for each of the latch members. One end of these springs is accommodated by recesses 305a and 305b within the main body portion of loading magazine 257; the other end of these springs is maintained in position against the latch members by means of pins 306a and 306b. A stop pin 307 is mounted in a manner similar to pivot pin 303 for the purpose of preventing the latch members from altogether stopping the issuance of the work pieces from loading magazine 257.

At the uppermost end and forward portion of loading magazine 257 there is provided an overload release gate 308. This gate 308 is normally retained in the closed position shown by Fig. 30 supported by a spring 309. When the various mechanisms below that point become jammed for one reason or another, an overload of work pieces causes pressure against gate 308 which in turn makes the gate open downwards about a pivot pin 310, enabling the excess work pieces to drop out of the machine through a chute 311 into a receptacle (not shown).

The loading wheel

The loading wheel 258 which receives work pieces 200 from loading magazine 257 is preferably made up of two identical saw-toothed wheel portions spaced from each other but both attached to a common hub portion 312. Also mounted on hub 312 is a pair of end plates 314a and 314b which serve to restrain the work pieces on loading wheel 258 from lateral movement (see Figs. 30, 45). Two rings of screws 315 and 316 serve to fasten end plates 314 and the bilateral portions of loading wheel 258 to hub 312. This hub is secured to a rotatable shaft 313 by means of a key 317 and a set screw 318. Shaft 313 is mounted for rotation within a pair of ball bearings 319a and 319b. Ball bearing 319a is mounted in a supporting member 320 (see Figs. 45 and 32) which is mounted on and attached to lower support shaft 248 by a set screw 321, and is further attached by a screw 322 to the rectangular support member 251. Ball bearing 319a, which fits into a specially provided recess 323 in member 320, is there retained by means of a spacer 324 and a retaining plate 325 fastened to member 320 by a ring of screws 326. Ball bearing 319b fills a shouldered recess 327 in a block 328 which is fastened by a number of screws 329 to the rear end of a plate 330 which is in turn attached by screws 331 to supporting bracket 85. A retaining plate 332 attached by blocks 333 to block 328 serves to hold ball bearing 319b in the position illustrated by Fig. 45.

A retaining and guide member 334, formed in two parts which together have the substantially arcuate shape represented in Figs. 26 and 30, serves to prevent the unfinished work pieces 200 from falling off loading wheel 258 as they are conveyed clockwise (as viewed from the left side) toward the pick up and delivery wheel 259. The two parts of retaining and guide member 334 have complementary flange portions 335 by which that member is mounted on lower support shaft 248 by means of a number of clamping screws 336 (see Figs. 30 and 45). Also aiding the support of member 334 are lugs 337 projecting therefrom through which screws 338 pass for attachment to support member 320 (see Fig. 32). The bottom and rearmost portion of retaining and guide member 334 is forked (see Fig. 45) so that the successive segments of the rotating delivery wheel 259 may pass therethrough.

The pick up and delivery wheel

The pick up and delivery wheel 259 which receives work pieces 200 from loading wheel 258 actually is not one continuous band but instead is comprised of a number of segments which are mounted on turret 76 by means of a tongue and groove construction generally indicated by 208 (see Figs. 3, 11 and 30) and screws 216 (see Fig. 30). By means of this construction, it will be understood that wheel 259 rotates with turret 76 in a counterclockwise position as viewed from the left side. The work pieces 200 which are picked up on the segmentally notched wheel 259 are prevented from falling off by means of a curved guide bar 224. This guide bar 224 is supported in the position shown by Figs. 26 and 30 through attachment to a supporting member 339 which is in turn mounted on an arm 340 and there held fast by screws 341. This arm 340, as Figs. 30 and 44 show, is supportedly attached by means of screws 342 to the rectangular supporting member 251. In order to maintain arm 340 in its required position it is necessary to space this arm from the supporting member 251; this is accomplished by means of studs 343 (see Figs. 30–44).

As will later be explained in more detail, the counterclockwise rotating delivery wheel 259 is synchronized with the clockwise rotating loading wheel 258 so as to pick up unfinished work pieces 200 therefrom and convey them to the proper positions where they will be acted upon by the aforesaid work piece injection mandrel 98, the tools 400—401, and work piece locator and ejector rod 97. After having been so acted upon the work pieces, having the finished form represented in the drawings by 201, are again picked up by wheel 259 on the lower portion of its circular travel and are carried to the take out conveyor 260 (see Figs. 1 and 46; note that Fig. 46 shows the pick up and delivery wheel and conveyor mechanisms as viewed from the right side of the machine). Serving to prevent finished work pieces 201 from falling off wheel 259 is a retaining guide 344 comprised of a pair of curved parallel bars which are secured to the take-out conveyor 260 by means of bolts 345 (see Figs. 46, 48). Serving to keep the two parts of guide member 344 in proper spaced relationship is a shouldered stud 346 threaded on both ends by which means the stud is fastened in position with the aid of nuts 347. A pair of parallel guide fingers 444 (see Figs. 46 and 52) attached to conveyor 260 by screws 445 aid in directing the finished work pieces to the troughs 402 on the take-out mechanism.

*The mechanism for inserting unfinished work pieces into the spindles*

In the illustrated embodiment of the present invention there are provided 30 work piece injecting mechanisms which serve to transfer unfinished work pieces 200 from wheel 259 into the work piece holding spindles 154 in the revolving turret 76. These thirty mechanisms are all identical in construction and function (see Figs. 11-14 inclusive), and the following description of one will apply to all thirty of them.

The injector mechanism is essentially comprised of a base portion 205 and a vertically positioned circular portion 204 (separated into a left and a right end portion by a sleeve 231) continuous therewith at each end of the base portion for housing the horizontally acting work piece injection mandrel 98. The mandrel itself is mounted in a pair of ball bearings 227a and 227b which in turn are assembled into sleeve 231. A cylindrical spacer 228 serves to maintain the two bearings 227a and 227b a desired distance apart. This spaced ball bearing assembly is maintained in a fixed position on mandrel 98 by means of the mandrel's flange 240 on one end, and at the other or right end by means of a lock washer 238 and a nut 239 which is attached to the threaded portion 237. The described bearing-mounted mandrel assembly is fixed against lateral movement within the housing sleeve portion 231 by virtue of bearing 227a being stopped by a shoulder on the right side, and a retaining pin 229 fastened on the left side to sleeve 231 by means of a ring of screws 230. Although the mandrel assembly is not permitted to have lateral movement within sleeve 231, the sleeve 231 itself is able to have limited lateral sliding movement, but is prevented from rotative movement by means of a key 213 which fits into a key way 214. The key 213 is fastened to the left end circular housing 204 by means of a bolt 215.

Sleeve 231 and the mandrel assembly which it contains is slidable horizontally within the limits of the left and right end circular housing portions 204. Normally there is contact between the shoulder 225 in the right end portion of housing 204 and the adjacent shoulder 226 of sleeve 231. Urging these two portions into such contact is spring 233 which encircles the right end of sleeve 231 in a specially provided recess 232 therefor. Spring 233 is retained in this position by means of a retaining cap 234 which is attached to right end portion of circular housing 204 by means of a ring of screws 235.

A bushing 242, which primarily is intended to aid in stripping finished work pieces from the mandrel 98 after removal from the spindle 154, also serves to support and guide mandrel 98 in its lateral motions. This bushing 242 is fitted into a two-piece supporting block 243 (see Figs. 11, 12) whose parts are fastened together by means of screws 241. The supporting block 243 is fitted into track 209 and is fastened by means of screws 246 to the slide support ring 245 and also to turret 76 by means of screws 244.

The base portion 205 of the work piece injector mechanism is slidably mounted in track 209, a pair of lateral guide strips 211 (secured to slide support ring 245 by screws 212) serving to keep the base within the track. Serving to control the lateral sliding movement of the injector mechanism is a roller connection with the cam groove 82 in the face of the cylinder cam 79 therebeneath (see Figs. 1, 3, 11, 14). The parts entering into this roller connection are the boss 206 which projects downward from base portion 205 through clearance slot 203 in slide support ring 245, a stud 217 which extends through this boss into attachment with the roller 207 therebelow. The upper end of stud 217, being threaded, is fastened in position by a nut 218 (see Fig. 11).

Mandrel 98 has the specially provided shape best illustrated by Fig. 11. As there shown the mandrel will be seen to have two principal diameters, the larger being that which is maintained within housing 204 and projects to the left therefrom, while the smaller diameter is that which extends to the free end terminating in a threaded portion 196. Fitted over the reduced diameter of mandrel 98 into contact with the mandrel's larger diameter is a cutter sleeve spacer 194. The left end of spacer 194, as seen in Fig. 11, has a specially reduced dimension for accommodating the tip of cutting tool 401 (see also Fig. 24A). Successively located after spacer 194 in the free end of mandrel 98 is a cutter sleeve 193 and a tapered tip 195. The tip 195 is threadedly attached to the threaded portion 196 on the free end of mandrel 98, and by such attachment serves to hold sleeve 193 and spacer 194 in position on the mandrel. As will be obvious, members 193—194—195 are replaceable and can be varied in size to suit the needs for cutting various lengths of work pieces.

THE MECHANISM FOR LOCATING UNFINISHED WORK PIECES IN THE SPINDLES AND FOR EJECTING FINISHED WORK PIECES THEREFROM

Just as there are provided thirty work piece injector mechanisms on the right side of the present invention's illustrated embodiment, so are there also provided thirty work piece locator and ejector mechanisms on the left side of the machine. These thirty locator and ejector mechanisms each serves to locate a work piece (which has been injected into one of the thirty spindles 154 in turret 76) in the proper position within the spindle for work to be done thereupon, and later, after the work thereon has been completed, serves to eject the work piece from the spindle. The following description of one such mechanism will apply to all thirty of them.

The construction of the work piece locating and ejecting mechanism is best illustrated in the drawings by Fig. 6. This mechanism, very much like the above described work piece injecting mechanism, is comprised of a base portion 101 and a vertical cylindrical housing 100 continuous therewith. The housing 100 contains the ball bearing mounted assembly which includes the work piece locator and ejector rod 97. This assembly consists of a sleeve 132 in which rod 97 is horizontally supported. The left end of rod 97 bears a thread 139 for adjustable attachment to sleeve 132. A lock nut 141 is provided for securing the threaded attachment of rod 97 and sleeve 132.

Encircling sleeve 132 is a pair of ball bearings 137a and 137b separated by a spacer 138. These two bearings and the spacer are maintained in position against a shoulder near the left end of sleeve 132 by means of a lock washer 135 and nut 134 which is threadedly attached to the sleeve as indicated at 140. The same means which hold the bearings and spacer on to sleeve 132, namely washer 135, nut 134 and the shoulder presented by sleeve 132, also serve to hold the described assembly within circular housing 100.

The base portion 101 is mounted for lateral slidable movement on track 109, being confined to the limits of that track by a pair of guide strips 111 (which are secured to the slide support ring 83 by screws 112). The lateral movement of base portion 101 and the parts resting thereon is controlled by means of a roller connection to cam groove 80 in the cylinder cam 78 therebelow. The parts which enter into this roller connection are a boss 102 which depends from base portion 101 through a clearance slot 103 in the slide ring support member 83, a stud 117 which extends from above base portion 101 through boss 102 into attachment with roller 107, and a nut 118 which is threadedly attached to the uppermost end of the stud.

THE COLLET OPENING AND CLOSING MECHANISMS

There are, in the illustrated embodiment of the present invention, thirty collet opening and closing mechanisms mounted on slide support ring 83 to the right of the work piece locator and ejector mechanisms with which they are synchronized for cooperative action. As in the case of the work piece injector and the locator-ejector mechanisms, since all of the collet-operating mechanisms are identical the following description of one will apply to all of them.

The construction of the collet opening and closing mechanism is best illustrated in Figs. 7–10 inclusive. This mechanism comprises a base portion 105 having a vertical circular housing 104 continuous therewith. Mounted horizontally within the circular housing 104 is an assembly which serves to support the aforementioned locator and ejector rod 97, while permitting axial passage of this rod therethrough, and also furnishes means for supporting the collect opening and closing plunger 113. The assembly contained within housing 104 consists of a cylindrical sleeve 122 supported by a pair of ball bearings 127a and 127b separated by a spacer 128. Bearing 127b has its right face resting against a shoulder 123 provided therefor by sleeve 122, and its left face rests against a shoulder 121 provided therefor by housing 104. The two bearings and the intervening spacer are thus maintained in the Fig. 7 position and prevented from any movement to the left by means of a lock washer 125 and a nut 124 which is threadedly attached as indicated at 126 to sleeve 122; movement of the assembly to the right is prohibited by a retaining plate 129 which is fastened to housing 104 by means of screws 130.

As reference to Fig. 7 will show, sleeve 122 protrudes a considerable length from housing 104. This protruding portion serves to support the collet opening and release plunger 113 which is threadedly attached thereto as indicated at 131. Provision is made for axial adjustment of member 113, and means in the form of lock washer 115 and lock nut 114 are available to hold member 113 in any desired adjusted position. The right-hand extremity of member 113 has a circular-shaped, stepped recess 116. This recess 116 is designed to accommodate the end of work pieces 200—201 and collet 159 when member 113 is moved into contact with collet holder ring 158 (see Fig. 10).

It will be obvious from the details of construction explained above that sleeve 123 and member 113 attached thereto are rotatable within the fixed ball bearings 127a and 127b. It should also be clear that locator-ejector rod 97 is free for axial movement from left to right and return through the central opening in sleeve 123 and member 113. For reasons which will later be made apparent, it is desirable to have rod 97 rotate together with member 113. This is accomplished by giving that portion of rod 97 which extends through member 113 the substantially hexagonal shape illustrated by Fig. 9. In this manner rod 97 and the chuck opening and release member 113 are in effect keyed together.

The base portion 105 is mounted for lateral, slidable movement on track 109, being confined to the limits of that track by the pair of guide strips 111. The lateral movement of base portion 105 and the parts resting thereon is controlled by means of a roller connection to cam groove 81 in the cylinder cam 78 therebelow. The parts which enter into this roller connection are a boss 106 which depends from base portion 105 through a clearance slot 103 in the slide ring support member 83, a stud 119 which extends from above base portion 105 through boss 106 into attachment with roller 108, and a nut 120 which is threadedly attached to the uppermost end of the stud (see Figs. 7—8).

THE WORK HOLDING SPINDLES AND COLLETS

As earlier mentioned, the illustrated embodiment of the present invention possesses thirty rotatable spindle assemblies spaced equidistant from each other and completely ringing the turret 76 (see Figs. 2, 4, 5). One of these spindle assemblies, generally indicated by the numeral 150, is shown in general relationship to the entire machine in Fig. 3, and in more complete detail in Fig. 10. These assemblies comprise a spindle housing 151 which is fitted into a cylindrical open provided therefor in turret 76. Substantially filling the inner diameter of spindle housing 151 is a pair of ball bearings 152a and 152b which are separated from each other by a spacer 153. Rotatably mounted within these two ball bearings is spindle 154, the left end of which has a flange portion which rests against the left side of bearing 152a. A collet base plate 162 has an overall diameter adequate to extend over a portion of the right-hand face of bearing 152b. This plate 162 is secured by means of a number of screws 163 to spindle 154, thereby serving to hold the encircling bearings and spacer together as a single unit. This particular function of plate 162 is duplicated on the other side of the spindle assembly by a retaining plate 170 which is fastened to spindle housing 151 by means of a ring of screws 171. The just described complete unit which makes up the principal parts of spindle assembly 150 is attached to turret 76 by means of another series of screws 175 which pass through retaining plate 170 and specially flanged portions of spindle housing 151.

Each of the described spindles 154 contains an automatically operated collet mechanism. This mechanism is made up of the following parts: the collet holder ring 158, which serves to support the forward end of collet 159 and give clamping pressure thereto; a key 156, attached by means of screw 160 to collet holder ring 158, whose purpose is to guide the ring member 158 in its lateral movement along key way 157; and the collet base plate 162 which has a central opening therethrough for supporting the right end of collet 159. Serving to clamp collet 159 on to plate 162 is a nut 165 threadedly attached to the collet as indicated at 166. Collet 159 is keyed by means of a key 164 to collet base plate 162 in order to insure positive rotation of the collet together with the collet base plate.

In order to accomplish the previously mentioned clamping action which holder ring 158 exerts upon collet 159, it is necessary to have a force urging ring 158 to move laterally toward the increasing diameter of the collet's left end. This force is supplied by means of a number of springs 169 which are equally spaced from each other and completely encircle ring 158. To accommodate these springs 169 there are provided recesses 167 in ring 158 and complementary recesses 168 in collet base plate 162. The spindle 154, and the just described parts of the collet mechanism carried thereby, receive their rotative force from a spindle follower gear 172 which is attached by means of a number of screws 174 to the collet base plate 162.

The just mentioned follower gear 172 is driven by the spindle drive gear 173 which in turn receives its driving force by a gear linkage to motor 180 (this motor is shown in Fig. 1) which will now be described. The views which best illustrate this linkage are Figs. 3 and 10. From those illustrations it will be seen that spindle drive gear 173 (of which there is one for each of the machine's illustrated thirty spindles 154) is mounted on a spindle drive shaft 182 and keyed thereto by a key 186. The drive shaft 182 for each of the drive gears 173 is rotatably supported within an opening 133 in an accommodating lug 350 therefor which is an extension from the turret (see also sector C in Fig. 4). One preferred way of rotatably mounting shaft 182 is to support it between a pair of ball bearings 183a and 183b (see Fig. 10) separating same a required distance by means of a spacer 184. A retaining plate 188 fastened in position by means of a ring of screws 189 serves to hold ball bearing 183a in the recess provided therefor in lug 350. Also supported by rotatable shaft 182 and keyed thereto by a key 185 is a follower gear 144 which abuts a flanged head portion 110 on the left end of shaft 182, and on the opposite side abuts the left face of bearing 183a. Follower gear 144, the two bearings 183a and 183b, spacer 182, and spindle drive gear 173 are all maintained on shaft 182 by means of a locking nut 190 which is threadedly attached to the right end of the shaft. A circular guard 191 is provided for protection of the operator from the moving gears and also for preventing metal chips and dirt from entering the parts. Similarly, another guard 351 serves a like purpose for the parts of spindle assembly 150.

The follower gears 144, of which there are thirty, one for each of the spindles to be driven thereby, all mesh with a single spindle drive ring gear 148 (see Fig. 3, sector B of Fig. 4, and Fig. 10). The spindle drive ring gear 148 is attached by means of a ring of screws 149 to the spider 147 which is a wheel having the irregular cross section best shown by Fig. 3. Spider 147 is supported for counterclockwise movement by means of a hub portion 348 which is supported by a pair of intervening ball bearings 202a and 202b on the hub portion 349 of turret 76. These bearings are separated by a spacer 352. Their outer races, which are held in position by a pair of retaining plates 353, actually abut and support spider hub 348, while the inner races which are held in position by retaining plates 354 are attached to spider hub 349. By virtue of this construction, spider 147 is enabled to rotate independently of the rotation of the turret 76.

Attached to spider 147 by means of a ring of screws 136 is the spider follower gear 146. This gear meshes with the spider drive pinion gear 145 which is mounted on a drive shaft 143 (see Figs. 2—3). This shaft 143 bears a sheave 179 held thereto by means of a key 355, the sheave being belt connected to another sheave 356 which is mounted on shaft 357 of motor 180.

As Fig. 3 shows, one preferred construction for rotatably mounting the spider drive pinion shaft 143 is to support the shaft between a pair of ball bearings 358a and 358b, separate them by a spacer 359, and place the entire assembly in a housing 142. Serving to maintain this assembly within housing 142 is a retaining plate 361 on the left end thereof and a nut 362 on the right end. This nut 362 also serves to hold spider drive pinion gear 145 on shaft 143. The housing 142 is supported on its left end by the machine's main left end support member 90 (to which it is fastened by screws 155), the housing's right end being supported by the internal web portion of left cylinder cam 78.

THE HEAD TURNING AND TRIMMING TOOL MEMBERS

As earlier explained, the illustrated embodiment of the present invention has been specially adapted for the head turning and trimming of small arms cartridge cases. To accomplish these functions there are provided thirty head turning tools 400 and thirty mouth trimming tools 401 (see Figs. 15 to 15D inclusive, 16, 17, 18, 18A, 22, 24, and 24A). However, it will be understood by those skilled in the art that other types of tools may be employed, depending on the type of work to be done upon the work pieces. The tool holders are so designed that they may accommodate various types of tools. The unique tool holding device which the present invention provides is adaptable for practically any type of tool to be employed. This will become clear from an understanding of the construction of the tool holders which will now be set forth, reference being principally made to Figs. 5, and 16 to 22 inclusive.

It will be understood that there is provided one tool holder on either side of the turret 76 and face cam 77 adjacent a corresponding spindle 154 making a total of thirty tool holders on each side of the turret or sixty tool holders in all. The tool holders are comprised of two main parts; the head turning tool holder has a main arm 363 and a tool block holder 364, while the parts of the mouth trim tool holder correspondingly are a main arm 365 and a tool block holder 366. The named tool holder main arms 363 and 365 are mounted on the respective ends of a tool post 367 which extends axially through and protrudes from both sides of turret 76 (see Figs. 3 and 17). This tool post 367 has a flange 368 which serves as a means for attachment to turret 76 with the aid of a ring of screws 369. In mounting arms 363 and 365, corresponding bushings 370 and 371 are provided in order to permit the arms to be free for rotation about tool post 367. Bushings 370—371 and arms 363, 365 are retained in their respective positions on tool post 367 by means of washers 372 and nuts 373 which are attached to the threaded ends 374 of the tool post.

Tool block holder 364 is fastened to arm 363 by means of a pair of screws 375. Slots 376 (see Fig. 16) are provided in member 364 in order to permit adjustment thereof. A similar construction is provided for fastening tool block holder 366 to arm 365 by means of screws 377 which pass through slots 378 in member 366 (see Fig. 22). Means for adjusting the tool block holders are provided in the form of a pair of set screws 379 which contact a dowel 380 that projects from arm 363 (see Fig. 16); similar adjustment means are provided for tool block holder 366 in the form of set screws 381 which contact dowl 382 that projects from arm 365 (see Fig. 22).

The ends of arms 363, 365 which are not mounted on tool post 365 are roller connected to respective cam grooves on opposite sides of face cam 77. In the drawings these roller connections comprise: forearm 363, roller 383 (which mates with face cam groove 86), a stud 384 and nut 385 by means of which the arm is attached to the roller; forearm 365, roller 386 (which mates with face cam groove 87), a stud 387 and nut 388 by means of which the arm is attached to the roller.

Referring now to tool block holder 364, it will be seen that a tool holding block 389 is therein contained, being there secured by a screw 390 (see Figs. 16, 21). The said block 389 supports the illustrated head turning tool 400 which is secured therein by means of set screws 391. As Fig. 16 shows, provision is made for permitting tool 400 to extend varying distances below holding plug 389 as may be required.

A very similar construction is provided for supporting tool 401 in a tool holding block 392. However, some differences do exist for the primary purpose of enabling tool 401 to be adjusted closer or farther away from the spindle in order to act upon the work piece at a greater or lesser distance from the spindle. The construction which makes possible this adjustment is as follows: an adjusting plug 393 (see Fig. 23) is threadedly engaged within a hole provided therefor, as indicated at 394, in tool block holder 366. The said threaded hole is split at one point by a slot 397 which extends thereinto from one side of tool block holder 366 (see Figs. 22—23). A screw 395 serves to attach plug 393 to tool holding block 392. Thus, by adjusting the position of plug 393 the relative position of block 392 may be moved toward or away from the adjacent spindle and work piece. Once the desired adjustment is accomplished, adjusting plug 393 may be secured against further movement by tightening a screw 396. This screw 396 serves to clamp together the two parts of block holder 366 which are separated by slot 397 as previously described, thereby gripping fast plug 393. The tool 401 is secured within tool holding block 392 by a number of screws 398, the construction being very similar to that described above for securing tool 400 in its block. This construction is such that tool 401 may be adjusted so as to extend a greater or lesser distance from the free edge of the block holder 366.

THE FACE CAM FOR CONTROLLING MOVEMENTS OF HEAR TURN AND TRIM TOOLS

Previously mentioned above was the face cam 77 which controls the movements of the illustrated head turning tool 400 and the case mouth trimming tool 401. Having discussed the various parts and function of this face cam, it may be beneficial at this point to study the cam in its entirety and its relation to the rest of the machine.

Figs. 2 and 5 show this cam 77 from the left side to consist of a circular ring which, for convenience of manufacture, was made in three parts. This ring-shaped face cam is fitted within a specially provided recess therefor in the machine's middle vertical supporting member 89 to which the cam is secured by a ring of screws 88. The face cam is further shown in section by Figs. 3 and 17, and in relationship with the tool holder arms 363 and 365 in the much enlarged views of Figs. 16 and 22.

As previously explained, the tool holder main arms are roller connected to the corresponding cam grooves 86—87 on opposite faces of the cam. As the tool holders are carried along by the rotating turret 76, they are caused by these roller connections to move into a cutting relationship with the work pieces during a certain period of turret rotation, after which they are caused to move away from this work piece cutting relationship. The manner in which face cam 77 controls this action is best illustrated by Fig. 2. There the letters CTA, which stand for "Cutting Tool Approach," indicate the approximate point where the tools are made to enter into cutting relationship with the work pieces. Between that point and another point indicated by the letters CTW, which stand for "Cutter Tool Withdrawal," the actual cutting or other operations being performed upon the work pieces is carried out. This region of the face cam is further designated as the "work cutting section." As close examination of Fig. 2 shows, the cam groove in this section decreases in its radial distances, as measured from the machine's main horizontal axis, in going from the "CTA" point to the "CTW" point. The remaining portions of the two cam grooves outside the "work cutting section," aside from a sharp connecting portion in the vicinity of the "CTA" and "CTW" points, have a constant radial distance which enables them jointly to serve as a dwelling period during which the tools and tool holders are out of contact with the work pieces.

THE CYLINDER CAMS FOR CONTROLLING MOVEMENTS OF THE WORK PIECE INJECTOR, LOCATOR-EJECTOR, AND COLLET OPENING AND RELEASE MECHANISMS

The left cylinder cam 78 and the right cylinder cam 79 have been mentioned above in describing the construction of other parts in relation therewith. However, for greater clarity of understanding it may be well to give them some special mention at this point.

The structure of these cylinder cams is best illustrated by Figs. 1 and 3 where they are shown in their relationship to the entire machine, while their functional accomplishments are best illustrated by Figs. 15 to 15E inclusive. As will be obvious by this time, it is necessary to control the lateral movements of the thirty injector mechanisms on the machine's right side so that they properly inject a work piece into the spindles at a time when the collets therein are open to receive the work pieces, and retract when no longer needed to support the work piece during the tooling operation thereon and subsequent redelivery to the delivery wheel 259. This function actually represents two separate steps accomplished by cam groove 82, the injecting step being illustrated by Figs. 3 and 15B to 15D inclusive, and the retracting step by Figs. 15, 15A and 15E.

Cam grooves 80—81 on left cylinder cam 78 are so designed that the movements controlled thereby are synchronized with the movements controlled by the just described cam groove 82 in right cylinder cam 79. Cam groove 81, which is responsible for controlling the movement of the collet opening and release mechanism accomplishes two steps: one, represented by Figs. 3, 15C, 15D, illustrates the position taken by the said mechanism before and after acting to open the collet; the other step, represented by Figs. 15, 15A, 15B and 15E, illustrates the position taken when said mechanism is acting to overcome the forces which serve to close the collet and allow the collet to open. Cam groove 80, which is responsible for controlling the work piece locator-ejector mechanism's movement, accomplishes three steps: one, represented by Figs. 15A to 15C inclusive, illustrates the position when the work piece locator 97 serves to position the work piece in the spindle; the second step, represented by Figs. 3 and 15D, illustrates the position when rod 97 has been withdrawn so as not to interfere with the cutting tools which immediately thereafter enter into contact with the work piece; and the third step, represented by Figs. 15 and 15E, illustrates the position when rod 97 has served to eject the work piece from the spindle.

THE WORK PIECE TAKE OUT CONVEYOR

The work piece take out conveyor 260, which is of a conventional link belt type of construction, serves to remove the finished work pieces 201, receiving them from the pick up and delivery wheel 259 in a manner previously explained. This take out conveyor is illustrated in general relation to the entire machine by Figs. 1—2, and is shown in more detail by Figs. 46 to 55 inclusive. The conveyor mechanism is supported in a horizontal position by means of a pair of legs 399, and is further supported by an attachment to the machine's central vertical support member 89. Since the conveyor mechanism is of a well known conventional construction, little description thereof is necessary, although the detailed drawings thereof which have been provided will be found to be fully illustrative and self-explanatory. However, certain unique features thereof are worthy of particular attention. For example, the V-shaped troughs 402 which are attached to the links 403 by means of rivets 404, are all given identification numbers which may be conveniently marked on the ends thereof, as for example the #5 indicated in Fig. 50. These numbers, in the present invention's illustrative embodiment, run from 1 to 30, corresponding to the number of spindles in the machine. Actually, depending on the length of the take out conveyor desired, there may be employed any convenient multiple of 30 troughs; in the illustrated machine there are three sets of such troughs or a total of ninety. Corresponding identification numbers from 1 to 30 are likewise applied to each of the spindles (see #5 and #6 illustratively shown in Figs. 16, 22). By this means it is possible for the operator, upon detecting a flaw in a finished work piece carried out by one of the troughs 402, to identify the particular spindle and cooperating tool which caused the imperfection, and arrange to replace the tool or otherwise rectify same. Of course, it will be understood that the numbered troughs must each be synchronized with a spindle having the same number. Once this synchronization is provided for, it will remain constant by virtue of the fact that the driving means for the conveyor is linked up with the main drive shaft 300 which is also responsible for rotating the turret and the spindles contained therein.

The driving means for the conveyor and other parts associated therewith are best illustrated in the drawings by Figs. 54 to 58 inclusive. From these drawings it will be seen that a sprocket 405 is attached to the right end of main drive shaft 300 (see also Fig. 1) by means of screws 406. A chain belt 407 connects sprocket 405 with conveyor drive sprocket 408 so that rotation of the main drive shaft transmits a rotative force to the take out conveyor 260. The Fig. 54 view which shows this linkage also depicts as parts thereof an idler sprocket 409 and a loading wheel drive sprocket 410. The illustrated relationship of these various sprockets has been so designed that as the main drive shaft rotates counter-clockwise, the conveyor drive sprocket also will be rotated in the same direction, whereas the loading wheel drive sprocket will be turned in a clockwise direction. The relationship of sprockets 409—410 and certain constructional details thereof are shown by Figs. 45 and 54. Sprocket 409 is secured by means of a washer 455 and screw 456 to the lower support shaft 248; sprocket 409 has a bushing 447 which is mounted on an eccentric member 448 which is freely rotatable about an extension 449 of stationery shaft 248 and bracket 85. In a somewhat analogous manner, sprocket 410 is rotatably mounted on a wheel 440 to which it is attached by screws 441, the wheel being secured to rotatable shaft 313 by means of a key 442 and a set screw 443.

The detailed construction of the conveyor drive mechanism is as follows. An adjustable housing 411 having a cross section which resembles a "figure eight" (see Fig. 58) is mounted on a stud 412. The lowermost portion of housing 411 has a split wall whose two sides are joined together by a screw 413 which serves to clamp that part of the housing around the stud 412. A circumferential groove 414 is provided on stud 412 so that screw 413 mates therewith (see Figs. 57—58). By this mating, housing 411 is prevented from sliding off the stud 412.

Stud 412 has an expanded portion which serves as a stationary housing 415 for mounting one end of the take out conveyor drive shaft 416. Integral with housing portion 415 is a base portion 417 which is attached by means of screw 418 to the machine's main right end support member 91.

Referring now to the upper half of the adjustable housing 411 which has the described "figure eight" cross section, it will be seen that a rotatable shaft 419 is mounted therein supported by a pair of ball bearings 420a and 420b. On the extreme right end of shaft 419 is mounted a wheel 421 which is keyed to the shaft by means of a key 422. Mounted on the wheel, and attached thereto by means of screw 423, is the conveyor drive sprocket 408. A washer 424, secured in position by a screw 436, serves to hold wheel 421 on shaft 419, and further serves to hold the wheel against bearing 420b which is thereby held in its proper position within housing 411 as shown by Fig. 57. On the left end of shaft 419 is mounted a conveyor drive gear 425. This gear is keyed to shaft 419 by means of a key 426 and is further secured to the shaft by means of a washer 427 which is held in position by a screw 437 which threadedly engages shaft 419. This use of washer 427 and screw 437 further serves to hold gear 425 against bearing 420a which is thereby held in its proper position within housing 411 as shown by Fig. 57. The entire assembly of parts including wheel 421, bearings 420a and 420b, gear 425 and the rotatable shaft 419 are all locked in their operating position with respect to housing 411 by a retaining plate 428 which is attached to that housing by means of a ring of screws 429.

Conveyor drive gear 425 meshes with a follower gear 430 that is mounted on the take out conveyor drive shaft 416. Serving to hold gear 430 on shaft 416 is a key 431 and a set screw 432. The right end of shaft 416 is mounted within housing 415, there being supported for rotation by a ball bearing 433. This ball bearing is held on the shaft by means of a washer 434 which is secured by a screw 435 that is threaded into the right end of the shaft 416. Ball bearing 433 and shaft 416 mounted therein are secured within housing 415 by means of a retaining plate 438 which is fastened to the housing by means of a ring of screws 439.

The take out conveyor drive shaft 416 preferably does not consist of a single unit for transmitting the rotative motion of gears 425 and 430 to the conveyor. Instead, for purposes of convenience in assembling and dismounting the parts, the shaft preferably is separable intermediate its two ends, as shown in the illustrative embodiment of the present invention (see Figs. 1 and 55). Two sections of shaft 416 may be conveniently joined together so as to provide unitary action thereof by means of the coupling 450—keys 451—set screws 452 in the arrangement shown in Fig. 55. The described gearing linkages turn shaft 416 in a clockwise direction, viewed from the left side of the machine just as were the other machine parts whose directions of rotation were previously identified. The Fig. 46 view which shows that end of shaft 416 which is directly linked to the conveyor belt has, for purposes of convenience in showing other parts, been taken from the right side of the conveyor. Accordingly, in that view, shaft 416 will be understood to revolve in a counterclockwise direction as will the conveyor belt being rotated thereby.

Reference to Figs. 55—56—57 will show special means for adjusting the position of the aforementioned adjustable housing 411. This means consists of an adjusting screw 453 which is threadedly attached to housing 411 and is of sufficient length to protrude therefrom for abutment against the machine's main right end support member 91. The distance between housing 411 and supporting member 91 may be varied by movement of this adjusting screw, and once the proper adjustment has been made screw 453 may be secured by means of a lock nut 454.

OPERATION OF THE COMPLETE MACHINE

From the foregoing description of the component parts of the present invention, the operation of my unique apparatus should be quite obvious to those generally skilled in the art, especially if reference is made to the diagram of the machine's "cycle of operations" shown in Fig. 59. Accordingly, the following description of the machine's operation will serve as a mere summary explanation. However, it should be understood, as was previously pointed out, that the various novel individual features and combinations represented by the present invention are not in any way intended to be restricted to the head turning and trimming operations of the caliber .30 small arms cartridge cases which have been illustratively represented as the adaption of my invention hereof.

Referring now to Fig. 1, the preferred procedure for putting the illustrated machine into operation will be understood. By means of an electric switch (not shown) motor 180 is started, and by virtue of gears and other linkages previously described, thus causes the counterclockwise rotation of the spindles 154. Next, by an electric switch (not shown) motor 219 is turned on and thereby causes the turret 76 to commence its counterclockwise rotation together with the pick up and delivery wheel 259 and slide support rings 83 and 245 attached thereto; and also energizes the take out conveyor 260 and loading wheel 258, both of which turn in a clockwise direction. Then, by another electric switch (also not shown) motor 264 is turned on. This motor causes the turnover wheel 255 and transfer wheel 256 to start their rotations in the manner which will be described below. Lastly, by means of another motor and electric switch (both not shown), a revolving hopper (also not shown) is turned on in order to effect a flow of unfinished work pieces to enter into the feeding mechanism in a uniform manner which will now be described.

Feeding operation

The cartridge case work pieces 200, having the unfinished heads and untrimmed mouths best shown by Figs. 10, 18, 24 and 31, enter the machine from a hopper (not shown) through a series of four feed tubes 253. These feed tubes serve to lead work pieces 200 to the magazine 254. These and other parts of the cooperating feeding mechanisms are are best illustrated by Figs. 25 to 31B inclusive.

From the feeding magazine 254 a continuous stream of work pieces, end to end and four abreast, are gravity-fed into the blind holes 293 in the turnover wheel 255. The work pieces drop into the turnover device with the head end 200a (shown enlarged in Fig. 18) first, and are thereby inverted approximately 180° so that they drop out and fall mouth end 200b (shown enlarged in Fig. 24) first into the grooves 210 in the transfer wheel 256 therebelow.

As viewed from the left side of the machine, the turnover mechanism rotates in a clockwise direction while the transfer wheel rotates in a counterclockwise direction. These two members are geared together and so synchronized that at the times when one row of blind holes 293 have their open ends facing downward, they are directly in line with the grooves 210 in the transfer wheel. Likewise, at the same instant, the opposing row of holes 293 have their open ends facing upwards and in line with the openings from feeding magazine 254.

The rotation of loading wheel 258, having an intermittent motion, makes it possible for that wheel to stop long enough for the work pieces to enter therein from the turnover wheel and simultaneously, approximately 180° removed therefrom, permits four work pieces to issue from the turnover wheel into the steplike channel which extends down through the loading magazine 257. In the loading magazine the work pieces now lie one on top of another in a horizontal position with their head ends all facing the left side of the machine. From this magazine 257 the work pieces are permitted to issue one by one under control of straightening wheel 297 and latch members 302a and 302b onto the loading wheel 258. There the work pieces are conveyed clockwise to a point on the horizontal line with respect to the axis of the main drive shaft 300 of the machine. This point, at which the cases are loaded onto the pick up and delivery wheel 259 is represented by the 0° mark in the Fig. 59 diagram.

*Loading operation*

As previously brought out, loading wheel 258 is arranged to straddle the segments which form pick up and delivery wheel 259. Furthermore, the clockwise moving loading wheel 258 and the counterclockwise moving pick up and delivery wheel 259 are so synchronized that as wheel 258 brings a work piece to the aforementioned zero degree position, a segment of wheel 259 immediately thereafter picks up the work piece and carries it in the latter wheel's upward travel.

The upwardly moving unfinished work pieces 200 being carried by pick up and delivery wheel 259 reach a point where they are contacted by a corresponding mandrel 98 therefor. Without any interruption of the counterclockwise rotation the mandrel progressively urges the work piece off wheel 259 and injects the work piece into a corresponding spindle 154 therefor. Selected views of this progressive insertion are represented by Figs. 15, 15A, 15B. Prior to the time when the actual injection of the work piece into the spindle takes place, provision has been made for the spindle to receive the work piece by having the collet 159 therein opened. This was accomplished by the collet operating plunger 113 which had earlier permitted the collet to open and made possible the ejection of a work piece therefrom. In similar fashion, the work piece locator-ejector rod 97 also has withdrawn from a position within the spindle after having ejected a finished work piece, stopping at the proper point to the left of the spindle for locating or positioning the new unfinished work piece in the collet (see Fig. 15C).

At this point, closing of the collet 159 into clamping position about work piece 200 is effected by the withdrawal of the collet operating plunger 113. This withdrawal permits the springs 167 in spindle 154 to urge ring 158 into a clamping position on the collet. It should be understood that spindle 154 is at all times rotating, and that mandrel 98, which fills the length of the work piece all the while that the cutting operations are taking place, also rotates with the spindle. Similarly, when the collet operating plunger 113 is in contact with collet 159 it also rotates with the collet and surrounding spindle, at the same time rotating the locator-ejector rod 97 therein. This rotation of members 98, 113 and 97 minimizes any "drag" effect which they may have on the rotating spindles, thereby making for maximum efficiency in operation.

*Cutting tool operations*

With the work pieces 200 constantly being rotated with the spindles 154 and without diminishing the orbital travel of the spindles being carried by the turret, head turning tool 400 and mouth trimming tool 401 are simultaneously brought into contact with the respective ends of the work piece for action thereon (see Figs. 15D, 16, 22). This cutting action takes place during the period that the turret and spindles are passing through the sector of their circular travel identified as the work cutting section in Fig. 2. It will be noted that mandrel 98 which supports (by means of the cutter sleeve 193 and cutter sleeve spacer 194 thereon) the walls of the work piece interiorly during the cutting operation, has a circumferentially notched portion 446 (actually in member 194). This notch 446 makes it possible for cutting tool 401 to cleanly sever work piece 200 at that point without causing damage to the mandrel or the cutter sleeves thereon. At the end of the cutting period the cutting tools 400—401 are withdrawn from the work piece to permit ejection thereof from the spindles.

*Unloading operation*

Upon completion of the cutting operations, the finished work piece 201 (in this case a head turned and mouth trimmed cartridge case) is then ready for ejection from the spindle and removal from the machine. To accomplish this, the first step is to release the pressure on collet 159 which is effected by the collet operating plunger 113 forcing ring 158 to compress against springs 167 in the spindle. As soon as the collet is thus opened, the locator-ejector rod 97 moves laterally to eject work piece 201 from the spindle (see Fig. 15E). During this ejection, and for a short period thereafter, mandrel 98 still fills the interior of the work piece, remaining therein until the work piece is supported by the parallel retaining guides 344 (see Fig. 46). At this point the mandrel is entirely withdrawn from the work piece (which is stripped from the mandrel by the aid of stripper bushing 242 shown in Fig. 11) and the pick up and delivery wheel 259 continues to move the work piece along guides 344 until, with the aid of parallel guide fingers 444, the work pieces are ushered into the corresponding trough 402 therefor in the take out conveyor 260. As Fig. 46 further shows, the finished work pieces are thus carried along by the conveyor to a point where they drop off into a receptacle (not shown).

SUMMARY

As has been shown, my improved machine here shown and described is capable of continuously and simultaneously head turning, trimming and/or performing other finishing operations on cartridge cases or the like; it has the capacity for performing such operations in a qualitatively suitable manner at an exceedingly rapid quantitative rate; it permits the entire series of work piece movements and operations thereon to be carried on without requiring any part of the machine to be stopped for loading or indexing operations; it includes a means for rapidly identifying which of the machine's many cutting tools has become defective and has caused a defect in the finished work piece in order that a new tool may be substituted therefor with a minimum of delay; and it has made possible a considerable increase in speed and decrease of labor required to perform head turning, trimming or other lathe-type operations on cartridge cases or the like.

It will be obvious, as was pointed out at different times throughout the specification, that the machine can readily be adapted to perform types of operations other than head turning and trimming and upon types of work pieces other than the small arms cartridge cases here illustratively shown and described. Obviously, too, more or less work pieces can be acted upon that the number acted upon within a given period by the illustrated machine (the present machine's capacity being of the order of 25,000 per hour) without departing from the scope of my invention.

My inventive improvements are therefore extensive in their adaption and are not to be re-

I claim:

1. A machine for cutting an ejection groove into the surface of each of a plurality of successive cartridge cases and for trimming an end of each said casing to reduce each casing to required length, said machine comprising: a turret member, a plurality of casing holders rotatably supported in said turret member, means for turning said turret member to move said casing holders continuously along an orbital path, means for rotating said holders and casings held thereby continuously about their own axes independent of said means for turning the turret member, means for delivering said casings to said machine, transfer means movable synchronously with said turret for receiving said casings one by one from said delivery means, means movable synchronously with said turret and reciprocatable transversely of said orbital path for injecting each casing received by said transfer means into a work holder, locator means movable synchronously with said turret and operative on each injected casing for properly positioning it in a corresponding one of said work holders for subsequent trimming and grooving of the casing, means for locking each thus located casing within said work holders after such positioning, groove cutting and chamfering means non-rotatably attached to said turret and adapted to reciprocate on an angle to the axis of the work holders for cutting a groove into and chamfering a surface of each rotating casing, mouth end severing means non-rotatably attached to said turret and adapted to reciprocate on an angle to the axis of the work holders for trimming said end of each said rotating casing, and means movable synchronously with said turret and reciprocatable transversely of said orbital path for ejecting each said so-treated casing from its work holder without diminishing its rotation, said transfer means, injector means, locator means, locking means, rotating means, groove cutting and chamfering means, mouth end severing means, and ejection means all being operative while the casings are continuously moving and rotating with their work holders in said orbital path.

2. In a machine for simultaneously head turning and mouth trimming cartridge cases, the combination of a continuously rotating work carrier, a plurality of rotatable work holders carried thereby for supporting and rotating the work intermediate its two ends, a plurality of non-rotatable tool holders disposed on both faces of said carrier and adapted to have reciprocatory movement on an angle to the axis of the work holders, a plurality of tools carried by said tool holders for acting on the work, a non-rotatable cylinder cam having a single cam groove therearound, a slide support ring continuously rotating around said cylinder cam at the same rate and in the same direction as said work carrier, a plurality of slide supports each extending across the outer surface of said support ring, a plurality of slides movably mounted on said slide supports and guided in their sliding movements back and forth across said support ring by means of roller connections with the cam groove in said cylinder cam, and a plurality of rotatable mandrels each one mounted for slidable movement on a different one of said slides in axial alignment with a corresponding one of said work holders and adapted axially to place the work into proper working position within those holders.

3. In a machine for simultaneously head turning and mouth trimming cartridge cases, the combination of a continuously rotating work carrier, a plurality of rotatable self-locking work holders carried thereby for supporting and rotating the work intermediate its two ends, a plurality of non-rotatable tool holders disposed on both faces of said carrier and adapted to have reciprocatory movement on an angle to the axis of the work holders, a plurality of tools carried by said tool holders for acting on the work, first and second slide support rings on opposite sides of and synchronously rotating with said carrier, a plurality of slide supports transversely disposed on the outer surfaces of both of said slide support rings, a plurality of slides movably mounted on said slide supports, a plurality of mandrels each one rotatably mounted on a different one of the slides operable on said first slide support ring and adapted to have reciprocatory movement axially into and out of said work holders for placement of the work therein, a plurality of hollow cylindrical means each carried on a different one of the slides operable on said second slide support ring and adapted intermittently to contact and thereby unlock said work holders thereby to admit work thereinto and permit ejection of work therefrom, and a plurality of other means including a plunger rod each carried on a different one of the slides operable on said second slide support ring and adapted to pass axially through said hollow cylindrical means at one stage along said ring's rotation to stop the work at the proper position when placed in said work holders, and at another stage along said ring's rotation to eject the work from said work holders.

4. In a machine for simultaneously head turning and mouth trimming cartridge cases, the combination of a continuously rotating work carrier, a plurality of rotatable self-locking work holders carried thereby for supporting and rotating the work intermediate its two ends, a plurality of non-rotatable tool holders disposed on both faces of said carrier and adapted to have reciprocatory movement on an angle to the axis of the work holders, a plurality of tools carried by said tool holders for acting on the work, a non-rotatable cylinder cam having a pair of dissimilar cam grooves therearound, a slide support ring continuously rotatable around said cylinder cam at the same rate and in the same direction as said work carrier, a plurality of slide supports each extending across the outer surface of said support ring, a first series of slides and a second series of slides mounted on said slide supports and each series guided in individual sliding movements back and forth behind one another across said support ring by means of roller connections with a respective one of the cam grooves in said cylinder cam, hollow cylindrical means carried by said first series of slides for intermittently contacting and thereby unlocking said work holders to admit work thereinto and permit ejection of work therefrom, and other means including a plunger rod carried by said second series of slides and adapted to pass axially through said hollow cylindrical means at one stage along said ring's rotation to stop the work at the proper position when placed in said work holders, and at another stage along said ring's rotation to eject work from said work holders.

5. In a machine for simultaneously head turning and mouth trimming cartridge cases, the combination of a continuously rotating work carrier, a plurality of rotatable self-locking work holders carried thereby for supporting and rotating the work intermediate its two ends, a plurality of non-rotatable tool holders disposed on both faces of said carrier and adapted to have reciprocatory movement on an angle to the axis of the work holders, a plurality of tools carried by said tool holders for acting on the work, first and second non-rotatable cylinder cams on opposite sides of said carrier the first having a single cam groove therearound and the second having a pair of dissimilar cam grooves therearound, first and second slide support rings encircling the respective cylinder cams and synchronously rotating with said carrier, a plurality of slide supports transversely disposed on the outer surfaces of both of said slide support rings, a plurality of slides movably mounted on the slide supports disposed on said first slide support ring and guided in their sliding movement back and forth across that support ring by means of roller connections with the cam groove in said first cylinder cam, a first series of slides and a second series of slides mounted on the slide supports disposed on said second slide support ring and each said series guided in individual sliding movements back and forth behind one another across that support ring by means of roller connections with a respective one of the two cam grooves in said second cylinder cam, a plurality of mandrels each one rotatably mounted on a different one of the slides operable on said first slide support ring and adapted to have reciprocatory movement into and out of said work holders for placement of the work therein, hollow cylindrical means carried by said first series of slides on said second support ring for intermittently contacting and thereby unlocking said work holders to admit work thereinto and permit ejection of work therefrom, and other means including a plunger rod carried by said second series of slides operable on said second slide support ring and adapted to pass axially through said cylindrical means at one stage along said ring's rotation to stop the work at the proper position when placed in said work holders, and at another stage along said ring's rotation to eject the work from said work holders.

6. In a machine for head turning and mouth trimming cartridge cases, a base, a pair of spaced support members vertically extending from said base, a ring-shaped face cam non-rotatably mounted between and parallel with said support members and comprising a disk having a pair of matched imperfectly circular cam grooves each encircling opposite faces of the cam, a main drive shaft horizontally supported for rotary movement between said vertical support members, a work carrier rotatably situated concentric with said face cam and attached by a projecting hub portion to said main drive shaft for simultaneous rotative movement therewith, a plurality of non-rotatable tool holders pivotally disposed on both faces of said work carrier and adapted to have reciprocatory movement on an angle to the axis of the work holders by means of roller connections to the cam grooves on the corresponding sides of said face cam, a plurality of tools one of which is carried by each of said tool holders for acting on the work, a plurality of rotatable work holders mounted adjacent the perimeter of said work carrier and adapted to hold the work intermediate its two ends so that said ends can simultaneously be acted upon by said tools on opposite sides of said work carrier, a plurality of drive gears each associated with one of said work holders and operable to effect rotation thereof, a ring gear for rotating said work holder drive gears, a gear train rotatably connecting said ring gear with said drive gears, means for rotating said main shaft, and means for rotating said ring gear independently of said main shaft's rotation.

7. In a machine for head turning and mouth trimming cartridge cases, a base, a pair of spaced support members vertically extending from said base, a ring-shaped face cam non-rotatably mounted between and parallel with said support members and comprising a disk having a pair of matched imperfectly circular grooves each encircling opposite faces of the cam, a main drive shaft horizontally supported for rotary movement by said vertical support members, a work carrier rotatably situated concentric with said face cam and attached by a projecting hub portion to said main drive shaft for simultaneous rotative movement therewith, a plurality of non-rotatable tool holders pivotally disposed on both faces of said work carrier and adapted to have reciprocatory movement on an angle to the axis of the work holders by means of roller connections to the cam grooves on the corresponding sides of said face cam, a plurality of tools one of which is carried by each of said tool holders for acting on the work, a plurality of rotatable work holders mounted adjacent the perimeter of said work carrier and adapted to hold the work intermediate its two ends so that said ends can simultaneously be acted upon by said tools on opposite sides of said work carrier, a plurality of drive gears each associated with one of said work holders and operable to effect rotation thereof, a substantially wheel-shaped "spider" having a hub which rotatively "floats" about the hub portion of said work carrier which encircles said main drive shaft, a ring gear attached to the rim of said spider and rotatable therewith, a gear train rotatably connecting said ring gear with said drive gears, means for rotating said main drive shaft, and means for rotating said spider independently of said main drive shaft's rotation.

8. In an automatic multiple spindle machine, the combination of a continuously rotating carrier, a series of work holders carried thereby each rotatable about an axis parallel to that of the carrier, a feeding magazine for receiving and spacedly aligning a plurality of work-pieces simultaneously introduced into the machine, turnover means adapted to accept the work-pieces from said feeding magazine and at regular intervals invert and deliver them to the next work station, a transfer wheel having spaced depositories and adapted to rotate so that one of said depositories is always in position to receive work delivered by said turnover means, a loading magazine adapted to receive the work from said transfer wheel and line the work-pieces up for issuance one by one therefrom, a loading wheel continuously rotating in a direction opposite to that of said carrier and having notches in its periphery for receiving the work pieces as they issue from said loading magazine, a series of tapered segments contiguously attached to the outer surface of said rotating carrier to form a segmentally notched "pick-up and delivery" wheel onto which the work is loaded as this wheel continuously rotates in the same plane and adjacent to but in an opposite direction from said loading wheel, means synchronously movable with said rotating carrier for pushing the work pieces off of said "pick-up and delivery" wheel one by one and successively injecting them into a successive one of said work holders carried thereby, means for rotating said carrier, means for rotating said work holders independently of said carrier's rotation, and means for coordinately rotating the said turnover means, transfer wheel, loading wheel, "pick-up and delivery" wheel, and the carrier to effect the foregoing operations.

9. In the machine of claim 8, the same combination additionally including an overload release gate resiliently mounted adjacent the entrance into the loading magazine and so adapted as normally to remain closed but to open and permit emergency exit of unfinished work pieces therethrough if the machine should jam and no room remains in the loading magazine to receive work pieces yet being delivered from the transfer wheel, and a chute for conveying the work pieces which exit through said gate away from the machine.

10. In the machine of claim 8, the same combination additionally including a latch member resiliently mounted adjacent the exit from the loading magazine's lower extremity and so adapted as to regulate the periodic issuance of the work pieces therefrom, and a straightening wheel having a transversely grooved periphery rotatably mounted opposite said latch member and adapted for properly positioning the work pieces on the loading wheel.

11. In an automatic multiple spindle machine, the combination of a continuously rotating carrier, $x$ number of rotatable work holders orbitally carried thereby each bearing a different visible identifying character, work pick-up and delivery means in the form of a wheel attached to said carrier for rotation therewith and having spaced work-supporting notches each one axially aligned with the axis of one of said work holders, means for receiving and properly aligning work pieces introduced into the machine, means for uninterruptedly transferring the thus received and aligned work pieces so that one of them rests on each of the work supporting notches of the continuously rotating work pick-up and delivery means, means synchronously movable with said rotating carrier and serving at one phase of the carrier's rotation to push the work pieces from said work pick-up and delivery means one by one and inject them into a successive one of said orbitally moving work holders, means synchronously movable with said rotating carrier and serving at another phase of the carrier's rotation to push the work pieces from said work holders one by one onto said work pick-up and delivery means, and an endless rotatable take-out conveyor for receiving work pieces from said pick-up and delivery means, said conveyor bearing $n$ series of individual work-piece supporting troughs of which each series comprises $x$ number of troughs, the troughs in each of said series each bearing a different identifying character thereon corresponding to one of the identifying characters on said work holders, the rotation of said conveyor being synchronized with the rotation of the carrier so that each work piece ejected from a character-identified work holder is picked up on a trough bearing a corresponding identification character.

KURT R. STADTHAUS.

REFERENCES CITED

The following references are of record in the file of this patent:

UNITED STATES PATENTS

| Number | Name | Date |
| --- | --- | --- |
| 1,289,390 | Calleson | Dec. 31, 1918 |
| 1,792,812 | Cameron | Feb. 17, 1931 |
| 2,059,710 | Rupple | Nov. 3, 1936 |
| 2,359,939 | Reynolds | Oct. 10, 1944 |
| 2,379,242 | MacNeill | June 26, 1945 |
| 2,425,170 | Wunsch et al. | Aug. 5, 1947 |
| 2,425,726 | Bunnell | Aug. 19, 1947 |
| 2,438,508 | Lewis | Mar. 30, 1948 |